US010870175B2

(12) United States Patent
Buchanan et al.

(10) Patent No.: US 10,870,175 B2
(45) Date of Patent: Dec. 22, 2020

(54) MICROFLUIDIC FLOW-THROUGH ELEMENTS AND METHODS OF MANUFACTURE OF SAME

(71) Applicant: CYTONOME/ST, LLC, Boston, MA (US)

(72) Inventors: Kristopher Scott Buchanan, Fort Collins, CO (US); Johnathan Charles Sharpe, Hamilton (NZ)

(73) Assignee: CYTONOME/ST, LLC, Bedford, MA (US)

( * ) Notice: Subject to any disclaimer, the term of this patent is extended or adjusted under 35 U.S.C. 154(b) by 224 days.

(21) Appl. No.: 14/490,326

(22) Filed: Sep. 18, 2014

(65) Prior Publication Data

US 2015/0129688 A1  May 14, 2015

Related U.S. Application Data

(60) Provisional application No. 61/879,379, filed on Sep. 18, 2013.

(51) Int. Cl.
| | |
|---|---|
| *B23K 26/38* | (2014.01) |
| *B23K 26/388* | (2014.01) |
| *B05B 1/02* | (2006.01) |
| *B23K 26/382* | (2014.01) |

(52) U.S. Cl.
CPC .............. *B23K 26/388* (2013.01); *B05B 1/02* (2013.01); *B23K 26/389* (2015.10)

(58) Field of Classification Search
CPC ........ B23K 26/389; B23K 26/382; B05B 1/02
See application file for complete search history.

(56) References Cited

U.S. PATENT DOCUMENTS

| | | | |
|---|---|---|---|
| 4,430,784 A | 2/1984 | Brooks et al. | |
| 5,093,548 A * | 3/1992 | Schmidt-Hebbel | .......................... B23K 26/0604 219/121.69 |
| 5,417,897 A | 5/1995 | Asakawa et al. | |
| 5,539,175 A * | 7/1996 | Smith | .................. B23K 26/073 219/121.7 |

(Continued)

OTHER PUBLICATIONS

Chen T-C, et al., Fundamentals of Laser Ablation of the Materials Used in Microfluiducs, in Micromachining for Fabrication of Micro and Nano Structures, Kahrizi M, editor, InTech, 35-60. 2012 Techniques.

(Continued)

*Primary Examiner* — Matthew J Daniels
(74) *Attorney, Agent, or Firm* — McCarter & English, LLP; David R. Burns

(57) ABSTRACT

Microfluidic flow-through elements and methods for forming and using the same, particularly, low cost, easily sterilized, disposable microfluidic flow-through elements may include an orifice region suitable, for example, for fluid jet formation (such as in a droplet sorter or flow cell) or sample injection or hydrodynamic focusing (such as in a non-droplet flow cytometer). Laser drilling, for example laser ablation, may be used to form an orifice region extending through an orifice wall section of a base substrate. The base substrate may be unitarily-formed by injection molding a polymeric material. The orifice region may be advantageously configured to form a predetermined geometry by controlling the characteristics of the ablating beam.

22 Claims, 11 Drawing Sheets

(56) References Cited

U.S. PATENT DOCUMENTS

| | | | |
|---|---|---|---|
| 5,985,216 A | 11/1999 | Rens et al. | |
| 6,228,311 B1* | 5/2001 | Temple | B23K 26/0604 |
| | | | 264/400 |
| 6,372,506 B1 | 4/2002 | Norton | |
| 6,667,459 B1* | 12/2003 | Woods | B23K 26/1435 |
| | | | 219/121.5 |
| 6,782,768 B2* | 8/2004 | Buchanan | G01N 15/1404 |
| | | | 73/865.5 |
| 6,808,075 B2 | 10/2004 | Bohm et al. | |
| 6,861,265 B1 | 3/2005 | den Engh | |
| 7,311,476 B2 | 12/2007 | Gilbert et al. | |
| 7,618,576 B2* | 11/2009 | Staats | B01L 3/0268 |
| | | | 250/435 |
| 7,861,409 B2 | 1/2011 | Macler et al. | |
| 8,573,060 B2 | 11/2013 | Huang et al. | |
| 2003/0111599 A1* | 6/2003 | Staats | H01J 49/0431 |
| | | | 250/288 |
| 2014/0076986 A1 | 3/2014 | Buchanan et al. | |
| 2014/0078502 A1 | 3/2014 | Buchanan et al. | |
| 2014/0170697 A1 | 6/2014 | Sharpe et al. | |

OTHER PUBLICATIONS

Piruska A, et al., The autofluorescence of plastic materials and chips measured under laser irradiation, Lab Chip 2005, 5, 1348-1354.
Schneider H, et al., 4.1.5 Hydrophilic Coating Materials, Sol-Gel Technologies for Glass Producers and Users 2004, pp. 187-194.
Laird, Joyce, "Teamwork Enhances the Flow—Breaking the boundaries in flow cytometry," Medical Product anufacturing News, Jan./Feb. 2007. Accessed on Jan. 17, 2017 at http://www.qmed.com/mpmn/article/teamwork-enhances-flow.

* cited by examiner

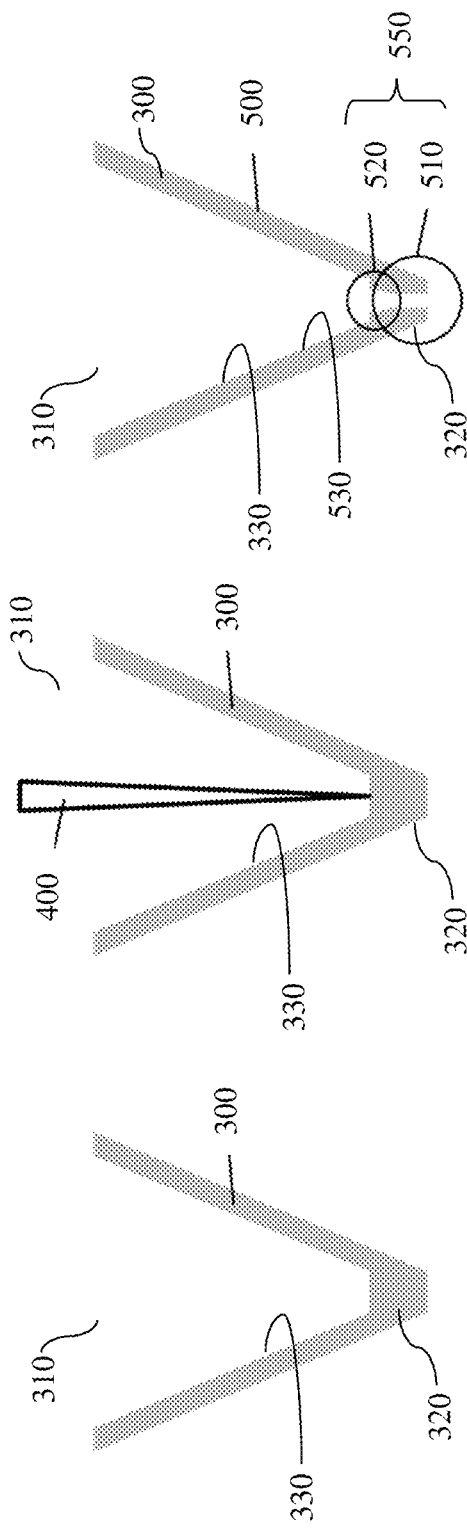

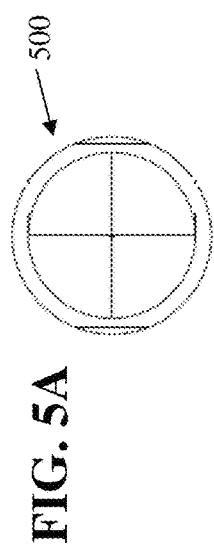
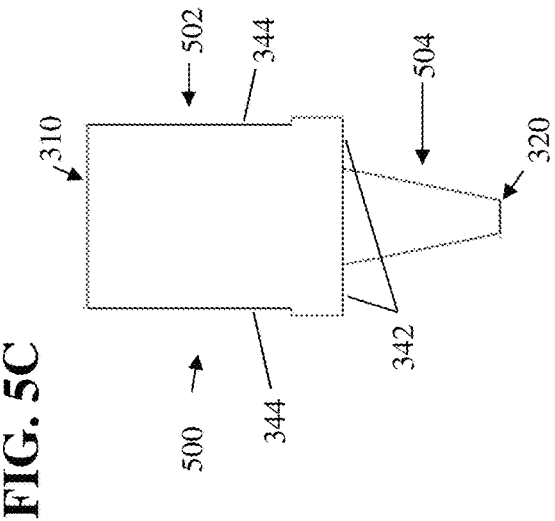
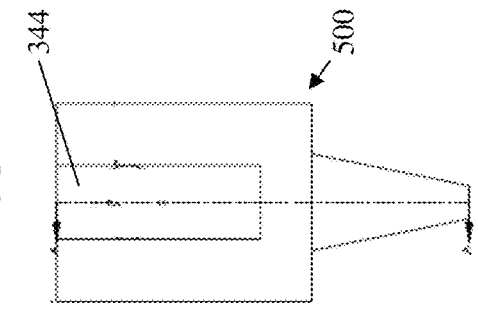
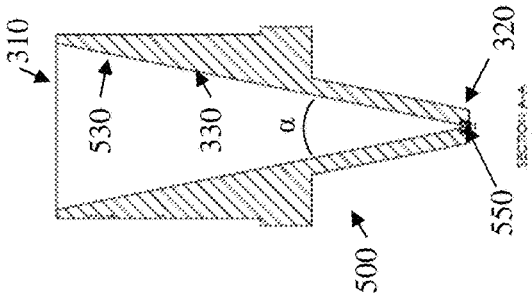
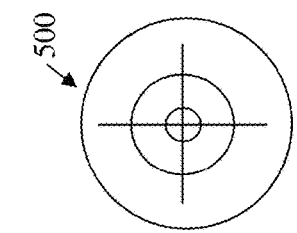
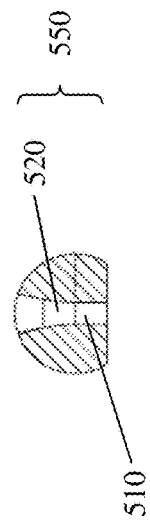

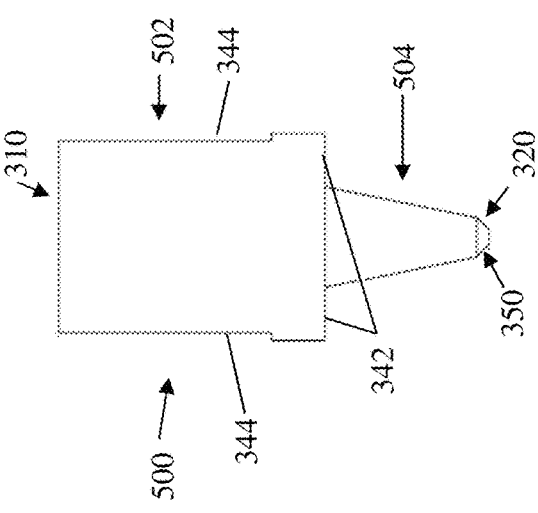
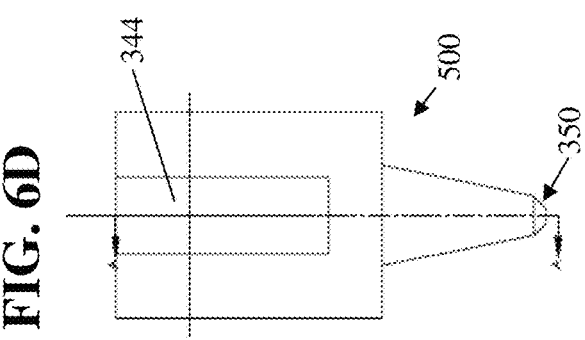
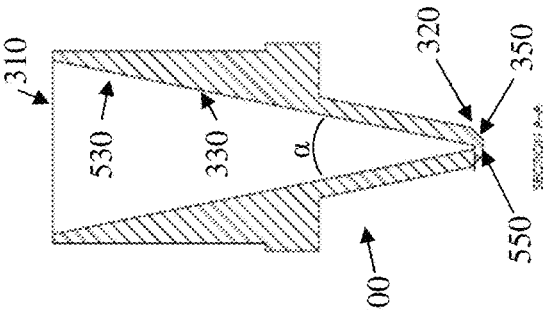
FIG. 6A  FIG. 6B  FIG. 6C  FIG. 6D  FIG. 6E

MICROFLUIDIC FLOW-THROUGH ELEMENTS AND METHODS OF MANUFACTURE OF SAME

RELATED APPLICATION

The present application claims benefit of, and priority to, U.S. Provisional Patent Application No. 61/879,379, filed Sep. 18, 2013, which is incorporated herein by reference in its entirety.

TECHNICAL FIELD

The present invention generally relates to the field of microfluidics and more particularly to microfluidic flow-through elements, such as nozzle tips and nozzle assemblies for microfluidic systems such as flow cytometer systems, and methods of manufacturing the same.

BACKGROUND

The creation of orifice regions in microfluidic flow channels including, for example, nozzles or nozzle tips, has historically been achieved by incorporating components of glass, quartz, fused silica, or precious stones such as jewels in the fabrication process. Disadvantages of creating a microfluidic flow channel that requires multiple components include difficulties in precisely locating the multiple components with sufficient accuracy to produce predicable and reproducible results, and difficulties in providing components that are free of flatness or surface defects which may thereby lead to leakages. Microfluidic orifices made of materials such as jewels are difficult, laborious, and expensive to manufacture due to the hardness of the material. Microfluidic orifices made of jewels additionally require special assembly techniques. Further, when the microfluidic channels and/or orifices are formed of multiple laminated layers stacked perpendicular to the flow path, the fluid flow path geometries are generally limited to square or rectangular orifices or flow channels.

Other conventional microfluidic nozzles or nozzle tips have been manufactured using ceramic molding. For ceramic-molded microfluidic tips a molding pin may be used to create the orifice. This pin is extremely fine, prone to damage and wear during the fabrication process, and further prone to bending and/or misalignment during molding, which may ultimately lead to non-ideal fluid conditions within the orifice and may for example, be manifested by improper fluid stream trajectories upon exiting the orifice. Further, a different mold needs to be manufactured for each desired orifice size. U.S. Pat. No. 6,782,768, which is incorporated by reference herein in its entirety, describes an effort to produce a ceramic nozzle tip that has precisely defined and reproducible features within a nozzle system and at the orifice in particular.

Such prior art orifice elements may be expensive to manufacture to the required tolerances and/or difficult to integrate into the remainder of the microfluidic systems.

SUMMARY

Exemplary embodiments of microfluidic flow-through elements and methods of forming and using the same are described herein and summarized below. These exemplary embodiments are not intended to limit the scope of the claimed invention which may encompass a variety of forms which differ from these summaries.

According to certain aspects, a process for forming a microfluidic flow-through element or component thereof includes forming a base substrate of the microfluidic flow-through element or component thereof, the base substrate having an internal fluid surface; aligning the base substrate relative to an orifice forming device; and forming an orifice extending through a wall of the base substrate with the orifice forming device.

According to other aspects, a process for forming an orifice in a microfluidic flow-through element includes providing a base substrate for a microfluidic flow-through element, the base substrate having an internal fluid surface; and subjecting the base substrate to electromagnetic radiation so as to form an orifice in an orifice region extending through a wall of the base substrate.

According to certain aspects, a process for forming a microfluidic flow-through element may include aligning a laser relative to a base substrate having a converging flow path with an end wall and directing a beam from the laser in a flow-path direction. The process may further include impinging the beam from the laser onto the end wall of the base substrate to thereby form an orifice region through the end wall of the base substrate with the beam from the laser. The orifice region may be configured to be in fluid communication with and downstream of the converging flow path. The orifice region formed by the beam from the laser may have an upstream orifice portion that converges and that smoothly merges with the converging flow path at a transition region. The microfluidic flow-through element may be a nozzle, a nozzle tip, a flow cell, a cartridge, etc.

According to some aspects, a process for forming a microfluidic flow-through element may include aligning a laser relative to a base substrate having flow path surfaces converging toward an end wall, the end wall having an end wall dimension defined between opposing flow path surfaces, directing a beam from the laser onto the end wall, wherein the beam from the laser has a corresponding cross-sectional beam dimension that is larger than the end wall dimension, and forming an orifice region through the end wall with the beam from the laser.

According to certain embodiments, the step of forming the orifice region in the above processes may include forming the upstream orifice portion having a first geometry and forming a downstream orifice portion having a second geometry different than the first geometry. The first geometry may have a convergence angle that is substantially equal to a convergence angle of the flow path. The second geometry may have a substantially constant cross-sectional area. The maximum cross-sectional area of the downstream orifice portion may be less than or equal to the minimum cross-sectional area of the upstream orifice portion. According to some embodiments, the transition region between the flow path and the orifice region may be formed without any discontinuities greater than 10 microns. The orifice region formed by the beam from the laser may have a downstream orifice portion that is non-converging.

The step of directing may include directing the beam from the laser in a downstream direction.

According to some embodiments of the above processes, the step of forming the orifice region may include ablating the orifice region. Further, the beam from the laser may have a non-uniform transverse intensity profile. The beam from the laser may have a transverse impinging footprint that is greater than a cross-section area of an exit orifice at the downstream end of the orifice region. At least a portion of the orifice region may be formed as a substantially cylindrical channel having a length between approximately 70 microns to 150 microns and a diameter between approximately 60 microns to 100 microns. The periphery of an exit orifice of the orifice region at its downstream end may include a non-chamfered edge.

The end wall may have an end wall dimension defined between opposed flow path surfaces, and the beam from the laser may have a corresponding cross-sectional beam dimension that is larger than the end wall dimension. According to some embodiments, the step of forming may include removing material from the surface of the flow path upstream of the end wall. According to other embodiments, the step of forming may include forming the orifice region without any discontinuities having a dimension greater than 10 microns.

According to certain embodiments, the processes may include injecting a polymeric material into a mold to form the base substrate. The processes may optionally include forming the base substrate from a polymeric material having a low autofluorescence at a wavelength between approximately 450 nm to 550 nm.

According to even other aspects, a single use, disposable, microfluidic flow-through element may be provided. The microfluidic flow-through element may include a unitarily-formed body defining an internal fluid surface having a converging flow path configured for laminar flow, a non-converging flow path located downstream of the converging flow path, wherein the non-converging flow path dimensionally restricts the converging flow path, and a transition region between the converging flow path and the non-converging flow path. The transition region may be configured to maintain a laminar flow. The non-converging flow path may have a maximum cross-sectional dimension of less than 100 microns and a length of greater than 50 microns and less than 200 microns. The unitarily-formed body may be formed of material having a low autofluorescence at a wavelength between approximately 450 nm to 550 nm and having a Vickers hardness of less than 500. The microfluidic flow-through element may be a nozzle, a nozzle tip, a flow cell, a cartridge, etc.

According to some embodiments, the non-converging flow path may be substantially cylindrical, and the converging flow path may be substantially conical. The non-converging flow path may have a maximum diameter of less than or equal to 85 microns. The non-converging flow path may have a length greater than its maximum cross-sectional dimension. The non-converging flow path may have a length between 75 microns and 150 microns. A centerline of the non-converging flow path may be aligned to within 10 microns of a centerline of the converging flow path. The internal fluid surface may be free of discontinuities having a dimension greater than 5 microns.

The unitarily-formed body may be formed by injection molding a polymeric material. The base material may have a Vickers hardness of less than 200 or even less than 100.

According to certain embodiments, the microfluidic flow-through element may be a nozzle tip having an exit orifice with a non-chamfered peripheral edge and a circularity within a tolerance zone of less than 10 microns.

Optionally, the converging flow path may include a fluidic torsional region having a hydrodynamic axis and may be configured to generate single torsional hydrodynamic forces. The non-converging flow path may be substantially cylindrical.

According to even other aspects, a single use, disposable, microfluidic flow-through element, or component thereof, may include a base substrate having a flow path defined by an internal fluid surface; and an orifice located downstream of the internal fluid surface, wherein the orifice dimensionally restricts the flow path. The orifice may have a diameter of less than 100 microns extending through a wall of the base substrate. The base material may have a Vickers hardness of less than 500.

BRIEF DESCRIPTION OF THE DRAWINGS

FIGS. 3A-3C schematically illustrate an exemplary process for forming an orifice region in a base substrate for a microfluidic flow-through element according to aspects of the present disclosure.

FIGS. 5A-5F illustrate an exemplary microfluidic flow-through element formed according to aspects of the present disclosure.

FIGS. 6A-6E illustrate a further exemplary microfluidic flow-through element formed according to aspects of the present disclosure.

DETAILED DESCRIPTION

Figure 1:
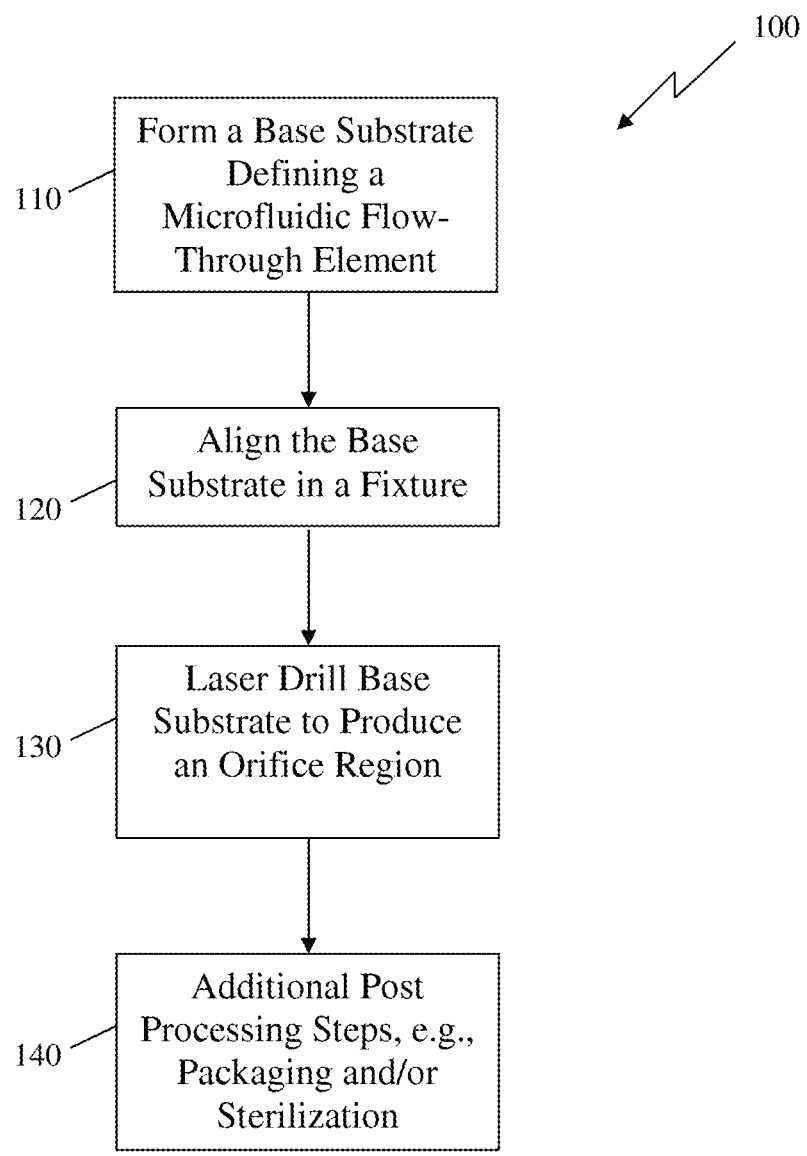
FIG. 1 depicts a flow chart of an exemplary process for forming a microfluidic flow-through element, according to aspects of the present disclosure.

In the fields of biology and medicine, there is often a need for high throughput analysis and sorting of particles. Flow cytometers and other microfluidic systems have been used for analyzing and sorting particles, and are particularly suited to processing biological materials, such as cells, based on measured and/or determined physical and/or chemical properties of the biological materials. In operation, a flow cytometer may process a fluid stream which includes a sample fluid containing particles of interest. These particles may be individually inspected in the fluid stream with a variety of sensing systems or detection devices and, in turn, classified. Sorting mechanisms may also be provided for isolating subpopulations of particles based on their measured or determined properties.

One microfluidic technique for sorting particles involves droplet deflection. See, for example, U.S. Pat. No. 6,372,506, which is incorporated by reference herein in its entirety. In droplet deflection a stream of suspended particles is broken into individual droplets, for example, using a piezoelectric mechanism. At the point of droplet formation, an electrical charging element is used to selectively charge each droplet. The charged droplet then free falls through an electrostatic field which deflects the charged particle into one of a plurality of receiving containers.

The formation of these droplets may be achieved at a flow cytometer nozzle assembly. A flow cytometer nozzle assembly may include various individual components including for example a nozzle tip. Nozzle assemblies or components thereof may be designed and tested to ensure the desired performance criteria are met. Such criteria can include, for example, whether the nozzle assembly/component is providing sufficiently uniform flow and/or orientation of particles, e.g., through an orifice region.

Another microfluidic technique for sorting particles may involve utilizing switching or pressure mechanisms to divert a volume of fluid containing a particle into a selected branch channel of a flow-path defined on a microfluidic chip. See, for example, U.S. Pat. No. 6,808,075, which is incorporated by reference herein in its entirety. In exemplary embodiments, a fluid containing particles may be injected via an injection site into a microfluidic channel or other microfluidic flow-through elements, for example, so as to create a particle stream. More than one fluid stream may be introduced. For example, sheath flow is a particular type of laminar flow in which one layer of fluid, e.g., a particle stream, is surrounded or bounded by another layer of fluid, e.g., a sheath fluid stream, on one or more than one side. The process of confining a particle stream in a fluid may be referred to as a 'sheath flow' configuration.

In exemplary embodiments, the sheath flow, i.e., the sheath fluid containing particles suspended therein, may be narrowed almost to the outer diameter of particles in the center of the sheath fluid. The resulting sheath flow may flow in a laminar state within an orifice region, e.g., such that particles pass through the orifice region in a single file row. Exemplary apparatus, systems and methods for injecting particles into a microfluidic flow-through element and creating sheath flow in a microfluidic system are described, for example, in U.S. Pat. No. 7,311,476, which is incorporated by reference herein in its entirety.

As evidenced by the microfluidic systems described above, microfluidic flow-through elements, such as nozzle tips, injection ports/sites, sheath flow focusing regions, and the like may often include orifice regions which may be important to the use/function of such elements. An orifice region may often be characterized by parameters such as size, shape, orientation, and other geometrical constraints. The configuration of an orifice region may advantageously result in a desired or predetermined flow profile of the fluid flowing through the microfluidic flow-through element. Thus, it is desirable to have accurate, efficient, cost competitive methods for fabricating microfluidic flow-through elements having microfluidic orifices for use in flow cytometers. Further, it is desirable to have inexpensive microfluidic flow-through elements having microfluidic orifices that may be repeatedly sterilized without compromising their properties. Even further, it is desirable to have inexpensive microfluidic flow-through elements having microfluidic orifices that are so inexpensive and efficient to manufacture that they may be considered to be disposable.

In general, the microfluidic flow-through elements and methods of forming and using the same described herein relate to an orifice region defined in a microfluidic flow-through element (for example, in a nozzle tip) which is created by concentration of a high power density of electromagnetic radiation or other energy beam, e.g., a collimated electromagnetic radiation beam, as a separate process from the act of forming a base substrate of the element. In some embodiments, a base substrate for a microfluidic element may be formed using an injection molding process, over-molding process, thermoforming process, blow molding process, vacuum forming process, 3D printing process and the like. Thus, as taught herein, forming a base substrate may include defining various basic features of the microfluidic flow-through element, for example, size, shape, configuration, flow-through regions, and the like. In exemplary embodiments, for example, involving injection molding of polymers, the molding process may be used to create injection molded microfluidic flow-through elements with wall sections that are generally approximately 500 microns (0.50 mm) or greater in thickness and defining features of the injection molded microfluidic element as fine as 50 microns. For example, certain walls may have thicknesses less than 500 microns or even less than or equal to 400 microns, or less than or equal to 300 microns, or even less than or equal to 200 microns.

As taught herein, finer microfluidic features such as required for orifice regions may be formed or otherwise defined using an electromagnetic radiation process commonly referred to as "laser drilling." Laser drilling may encompass both an ablation-dominated laser machining process, i.e., "laser ablation" and a melt-dominated laser machining process, i.e., "laser melting." In exemplary embodiments, the radiation may be directed or focused with respect to a particular target on a base substrate or preform of a microfluidic flow-through element, for example, after an alignment operation which aligns the location of the desired orifice region and the orifice forming device relative to features optically or mechanically identified on the base substrate. Thus, the electromagnetic radiation process may be preceded and guided by the alignment operation. Other mechanisms or means for forming orifices, such as mechanical drilling, piercing, water jet cutting, grinding, turning, etching, electron beam machining and or lithography, ultrasonic machining, etc. as would be known to persons of ordinary skill in the art, may be used to form or partially form the orifices in the preform or base substrate.

As used herein, the "orifice region" is defined as that portion of the wetted, internal surfaces of the microfluidic flow-through element that are formed by drilling through the base substrate during an auxiliary machining operation. Notably, the use of the electromagnetic radiation process to define an orifice region may occur during, before or after the formation of the base substrate for the microfluidic flow-through element. Thus, for example, laser drilling (e.g., ablation) may be used to define an orifice region in a substrate material before, during or after a single stage or multi-stage process of forming or shaping the substrate material into a base substrate or preform of the microfluidic flow-through element. Optionally, a rough aperture may be formed or partially formed in the base substrate and may be subsequently further laser machined to form the finished orifice region of the microfluidic flow-through element.

The orifice region may be formed in one or more steps. For example, electromagnetic radiation may be directed toward the orifice region from a single direction. Optionally, electromagnetic radiation may be directed or focused toward the orifice region from a plurality of directions with respect to the base substrate. For example, in some embodiments, electromagnetic radiation may be directed or focused from an upstream end, from a downstream end, or from both an upstream and a downstream end of an unfinished nozzle tip or other unfinished microfluidic flow-through element.

The term "flow-path" as used herein refers to a pathway formed in or through a medium, e.g., through a substrate, that allows for flow of fluids, such as liquids and gases. One of ordinary skill in the art will be able to determine an appropriate volume and length of the flow-path depending on the application or use thereof. A flow-path may have any selected path shape or arrangement along the longitudinal direction of flow, examples of which include a linear or non-linear, a sinusoidal, a sawtooth, a meandering, and/or a U-shaped configuration. The flow-path may have any three-dimensional geometry or shape, including a converging, diverging and/or constant cross-sectional area along the flow direction of the flow-path, including linearly tapered or non-linearly tapered, conical, cylindrical, rectangular, elliptical, flattened, asymmetric, symmetric, axisymmetric, twisted, and the like.

As used herein, the term "microfluidic flow-through element" refers to an element for handling, processing, ejecting and/or analyzing a fluid sample including at least one flow-path having microscale dimensions (e.g., 1 micron to 1 mm). According to some aspects, a flow-path having microscale dimensions may have one or more cross-sectional dimensions in the range between 10 microns and about 500 microns, more preferably between about 25 microns and about 250 microns and most preferably between about 50 microns and about 150 microns. The forgoing ranges are intended to include the above-recited values as upper or lower limits.

As used herein, the term "base substrate" for a microfluidic flow-through element refers to a preform or an element that has undergone some preliminary forming or shaping so as to be provided with an approximate final shape, size or form for a microfluidic flow-through element, but is not yet in its final usable form. For example, a molded base substrate may have the basic geometry of the ultimate microfluidic flow-through element or a component thereof, including a hydrodynamic focusing region having internal fluidic surfaces, but may be lacking an orifice or an orifice region.

As used herein, an "orifice" is any opening, hole, aperture, passage, etc. that has a reduced cross-sectional area relative to a chamber or channel with which it is in fluid communication. Thus, an orifice is understood to be dimensionally restricted relative to the chamber or channel with which it is in fluid communication. As used herein, the term "orifice region" refers to a region or regions in a microfluidic flow-through element leading into or leading out from an orifice and/or to the orifice itself. Thus, in exemplary embodiments, an orifice region may be characterized, for example, by a predetermined lead-in (i.e., entrance) geometry or a predetermined lead-out (i.e., exit) geometry or both. The orifice region may be formed in a secondary manufacturing process by laser drilling a molded base substrate.

Advantageously, according to the present disclosure, an electromagnetic radiation process may be used to define the orifice region, including, for example, defining the lead-in or lead-out geometry thereof, in a base substrate of a microfluidic element. The specific lead-in and/or lead-out geometry may be provided as a function of laser power, beam geometry and intensity pattern, location of the focal point, angle of the beam, masking elements, movement of the beam and/or movement of a beam masking element, etc. The configuration of the upstream portion of the orifice region may advantageously smoothly extend the surfaces of the hydrodynamic focusing region and be used to affect a desired or predetermined flow profile through the orifice region, for example, for focusing or aligning a stream of particles in a sample; the configuration of the downstream portion of the orifice region may advantageously be used to affect the behavior of the stream exiting the orifice (for example, forming droplets) and the behavior of the stream downstream of the orifice (for example, minimizing spray).

The techniques of the present disclosure advantageously enable the production of low cost, easily sterilized, disposable microfluidic flow-through elements which include an orifice region suitable, for example, for fluid jet formation (such as in a droplet sorter or in a flow cell), or sample injection or hydrodynamic focusing (such as in a non-droplet flow cytometer). Laser drilling, for example, laser ablation, may be used to drill through a closed wall section, for example, up to several millimeters in thickness. In exemplary embodiments, described herein the wall thickness of the base substrate for the microfluidic flow-through element may generally be between approximately 500 microns and 1 mm or greater prior to drilling. In certain areas, for example at a downstream terminal end where an orifice region is to be located, the wall thickness of the base substrate of a microfluidic element may be less than 500 microns. In some embodiments, the wall thickness of the downstream terminal end of the base substrate may be between 50 to 400 microns thick, between 100 to 300 microns thick, or even approximately 250 microns thick.

In exemplary embodiments, the orifice region may be advantageously configured to form or otherwise define one or more portions having a predetermined geometry, for example a predetermined entrance or lead-in cross-sectional geometry, a predetermined exit cross-sectional geometry, a predetermined minimum cross-sectional geometry, and the like. Example cross-sectional geometries for these portions of the orifice region may include circular, elliptical, square, rectangular, polygonal, etc. Further, each of these predetermined cross-sectional geometries may be advantageously paired with a predetermined length in the flow direction. In the simplest example, the orifice region may have a cylindrical configuration extending from the orifice inlet wall surface to the orifice outlet wall surface. Optionally, the cross-sectional geometries need not be constant along the length of the orifice region, but may increase or decrease along a length of the orifice region. Thus, exemplary cross-sectional geometries may include a fluid focusing-type geometry such as a converging geometry extending from the orifice inlet wall surface to the orifice outlet wall surface. As another example, a smoothly tapered, for example, conical, geometry may be provided as a lead-in geometry. In certain embodiments, a smoothly tapered, funnel-shaped (i.e., non-linearly converging) geometry may be provided as a lead-in geometry.

The orifice region may include an upstream portion having a first geometry and a downstream portion having a second geometry. In other exemplary embodiments, a lead-in fluid focusing-type geometry may lead to a non-converging or non-tapered, for example, a cylindrical, exit geometry. In exemplary embodiments, an elliptical or otherwise elongated cross-sectional geometry may be employed along one or more longitudinal or flow direction portions of the orifice region, for example, so as to facilitate particle alignment and/or particle orientation. Thus, exemplary geometries for various portions of the orifice region may include cylindrical, conical, funnel-shaped (i.e., circular cross-section that non-linearly converges or diverges), elliptically-tapered (i.e., elliptical cross-section that linearly or non-linearly converges or diverges), etc. In some converging geometries, the shape of the convergence may follow a Gaussian or normal distribution. More than one type of geometry may define the various portions of any given orifice region. Exemplary geometries along the length of an orifice region may include conical to cylindrical, conical to elliptically-tapered, conical to elliptically-tapered to cylindrical, elliptically-tapered to conical to cylindrical, elliptically-tapered to elliptical cross-sectional non-tapered and other combinations of elongated and non-elongated cross-sectional geometries in tapered and non-tapered configurations.

According to certain aspects, an orifice may have one or more cross-sectional dimensions in the range between 10 microns and about 500 microns, more preferably between about 25 microns and about 250 microns and most preferably between about 50 microns and about 150 microns. According to some embodiments, the orifice may have a nominal diameter of approximately 70 microns, of approximately 80 microns, or of approximately 100 microns.

As discussed above, the orifice region may be formed via an electromagnetic or other energy beam drilling, ablating, melting, etc. the substrate material. As known to those of skill in the art, an electromagnetic or other energy beam may have an impinging diameter (i.e. the ablating footprint) ranging from approximately 5 microns up to approximately 500 microns. According to a preferred embodiment, the energy beam may have an impinging diameter of 100 microns plus/minus 50 microns. According to certain embodiments, the energy beam may be provided by a Nd:YAG laser, a $CO_2$ laser, an excimer laser, etc. The energy beam may be either pulsed or it may be continuous.

Exemplary electromagnetic beam cross-sectional shapes or geometries which may be used in the laser drilling process may include circular, elliptical, square, rectangular, polygonal, etc. Exemplary electromagnetic beam characteristics which may be used in the laser drilling process may include Gaussian, top hat (flat top), and the like. One or more transverse electromagnetic laser modes may also be utilized to produce the desired orifice such as $TEM_{00}$, $TEM_{01}$, $TEM_{10}$, $TEM_{20}$, $TEM_{02}$, etc. The focal point may be a steady or variable focal point and may be positioned before (i.e., in front of or upstream of), at, or after (i.e., behind or downstream of) the surface of the substrate wall. Optionally, the position of the focal point may be constant or may vary. Different beam geometries, pulse durations, focal points and intensity patterns may be used to create the desired orifice region geometries. See for example, T. C. Chen and R. B. Darling, "Fundamentals of Laser Ablation of the Materials Used in Microfluiducs," in Micromachining Techniques for Fabrication of Micro and Nano Structures, Dr. Mojtaba Kahrizi (Ed.), InTech, pp. 35-60 (2012), which is incorporated by reference herein in its entirety.

As one non-limiting example, the intensity profile of the laser drilling beam may be greatest at its centerline and may taper off as it approaches its edges. This intensity profile may be used to advantageously, smoothly, and gradually merge the laser drilled orifice region with the internal fluidic surfaces of the as-molded base substrate. Using this or other intensity profiles, discontinuities at the boundary of the internal fluidic surface of the as-molded base substrate and the upstream portion of the laser drilled orifice region may be substantially eliminated or minimized.

According to certain embodiments, the upstream portion of the laser drilled orifice region may continue or extend the internal fluidic surfaces of the as-molded base substrate without a substantial change in slope. Thus, a tangent to the internal fluidic surface of the as-molded base substrate adjacent to the molded/laser drilled boundary and a tangent to the upstream portion of the laser drilled orifice region adjacent to the molded/laser drilled boundary may be substantially equal (e.g., within 15 degrees, within 10 degrees, or even within 5 degrees). As one non-limiting example, the as-molded internal fluidic surfaces of the base substrate may define a conical geometry having an internal angle of between 20 and 25 degrees, and the upstream portion of the laser drilled orifice region may define a substantially conical and/or a funnel geometry having an internal angle of between 20 and 25 degrees. The substantially conical and/or funnel geometry of the laser drilled orifice region may vary somewhat from the theoretical depending upon the various parameters (e.g., pulse time, power, profile, focal point location, etc.) used to control the laser drilling process and the characteristics of the material being laser drilled.

According to some aspects, the cross-sectional dimensions of the laser drilling electromagnetic beam may be greater than the cross-sectional dimensions of the finally-formed orifice at the downstream end of the orifice region. In other words, during the orifice region forming process, the illuminating footprint of the laser drilling beam may contact a transverse area of the base substrate greater than the transverse area of the finally-formed orifice at the downstream end of the orifice region. According to certain aspects, the edges of a laser drilling beam may contact the fluid surfaces of the base substrate in a hydrodynamic focusing region (e.g., in a region where the fluid surfaces have a tapered, converging geometry), while the center of the laser drilling beam may at least primarily contact the surface of the wall forming the downstream end of the base substrate. If, according to certain embodiments, the intensity of the laser drilling beam is greatest at its center and lower at its periphery, then the hydrodynamic focusing surfaces of the base substrate will be lightly laser drilled, while the downstream wall of the base substrate will be more strongly laser drilled. This may allow the laser drilled orifice region to include an upstream orifice region that is feathered and smoothly merged with the as-molded geometry of the hydrodynamic focusing surfaces of the base substrate and a downstream orifice region forming a substantially straight-sided channel through the downstream wall.

Thus, controlling the transverse intensity profile and dimensions of the laser drilling beam, while taking into account the geometry and material of the as-molded base substrate, may be used to develop the desired geometry for the orifice region. As an example embodiment, the base substrate may be molded of a cyclic olefin copolymers (COC) or a Poly(methyl methacrylate) (PMMA) with an as-molded internal fluidic surface defining a conical geometry having an internal angle of approximately 23 degrees, the laser drilling beam may have circular cross-section with a $TEM_{00}$ intensity profile and a transverse diameter of between approximately 0.5 mm to approximately 1.0 mm that forms an upstream orifice region portion having a substantially conical or funnel-shaped geometry with an internal angle of approximately 23 degrees and a downstream orifice region portion having a cylindrical geometry having a circular cross-section with a transverse diameter of between approximately 70 microns to approximately 100 microns. The length of the cylindrical geometry forming the downstream orifice region portion may range from approximately 50 microns to approximately 250 microns (and more preferably from approximately 80 microns to approximately 150 microns). As would be apparent to persons of ordinary skill, given the benefit of this disclosure, any of the various parameters of the laser drilling process may be controlled to provide the desired geometry for the orifice region.

Materials used in forming the microfluidic flow-through element may include, for example, any thermosetting or photo-curing resin, high performance engineering polymers, engineering polymers, standard polymers whether crystalline or amorphous, or the like. According to some embodiments, it may be preferred to minimize the amount of autofluorescence inherent in the microfluidic flow-through element, especially if an interrogating laser beam and/or an interrogated fluorescing particle are located near the microfluidic flow-through element. Any autofluorescence from the microfluidic flow-through element could increase the background noise and potentially interfere with accurately detecting the fluorescent signal. Thus, in certain exemplary embodiments, it may be desirable to have the microfluidic flow-through element exhibit low autofluorescence properties, particularly with respect to laser wavelengths of 403, 488, 532 and 633 nm. Common examples of thermoplastic resins that are known to have low autofluorescence properties include cyclic olefin copolymers (COC), Poly(methyl methacrylate) (PMMA), and the like. According to certain embodiments, the base substrate may be formed of polymeric material having a "low autofluorescence," i.e., an autofluorescence intensity less than 15 times the autofluorescence intensity of BoroFloat glass. According to certain other embodiments, the base substrate may be formed of polymeric material having a "very low autofluorescence," i.e., an autofluorescence intensity less than 10 times the autofluorescence intensity of BoroFloat glass. The autofluorescence intensity may be measured at specific wavelengths, for example, at laser wavelengths of 403 nm, 488 nm, 532 nm and/or 633 nm (when subjected to 1 mW of laser power for 60 seconds). Further a material may be characterized has having a low (or very low) autofluorescence over a particular wavelength range, for example, 350 nm-900 nm or sub-regions thereof (e.g., approximately 350 nm-450 nm, approximately 430 nm-530 nm, approximately 480 nm-580 nm, approximately 450 nm-550 nm, and/or approximately 580 nm-680 nm). It is recognized that any specific material may have a low (or very low) autofluorescence at a particular wavelength or over a particular wavelength range, but not at other wavelengths. "The Autofluorescence of Plastic Materials and Chips Measured Under Laser Irradiation," Piruska, A. et al., *Lab Chip*, 2005, 5, 1348-1354, which is incorporated by reference herein in its entirety, provides a method for measuring the autofluorescence of materials.

In certain exemplary embodiments, the materials used in forming the substrate may advantageously allow for photo-excitation (for example, fluorescent excitation) or photo-collection (for example, imaging) of a sample or of other fluidic elements through the walls of the microfluidic flow-through element. COC, Cyclic Olefin Polymer (COP) and PMMA are examples of materials with high transmission rates in wavelengths of interest (for example, 350-900 nm or sub-regions thereof (e.g., approximately 350-450 nm, approximately 430-530 nm, approximately 480-580 nm, and/or approximately 580-680 nm)) which may allow for photo-excitation or collection of optical signals through the walls of the microfluidic flow-through element. The base substrate for the microfluidic flow-through element may be initially formed (e.g., prior to laser drilling, or otherwise forming, an orifice region) using, for example, injection molding, thermoforming, blow molding, vacuum forming, 3D printing, and the like.

According to other aspects, the materials used in forming the microfluidic flow-through element may be considerable softer than conventional materials used for forming nozzle tips and/or orifice elements. Conventional materials, such as ceramics, quartz, glass etc., have a high hardness, which provides excellent durability and wear resistance. For example, ceramics generally have a Vickers hardness of greater than 2000. Quartz may have a Vickers hardness of greater than 1000. Glass may have a Vickers hardness of greater than 500. Metals may have a Vickers hardness ranging from 50 to 1000, depending upon their elemental composition, their worked form, and their annealing or work hardening. Orifices formed from such high hardness materials generally retain their dimensional tolerances even after many uses. On the other hand, polymers generally have a Vickers hardness less than 200, and in many instances, less than 100, and in some instances less than 50. For example, PMMA has a Vickers hardness less than 20. Softer materials such as polymers may be less expensive and may allow for ease of manufacture. Materials having a Vickers hardness less than 500 may involve sufficient ease of manufacture so as to be cost effective for producing single use, disposable, microfluidic flow-through elements. Materials having a Vickers hardness less than 200 may be preferred.

Coatings may also be applied to the microfluidic flow-through element before, during or after the production thereof, for example, before, during or after the formation of the base substrate of the microfluidic flow-through element or before, during or after formation of the orifice region. Such coatings may advantageously alter the surface properties of the microfluidic component. For example, coatings may be used to impart lubricity, increase or decrease hydrophobicity (allowing for fluid contact angle modifications), improve sterility, facilitate light protection and/or containment, and/or adjust optical properties such as preventing or inhibiting autofluorescence. Coatings for lubricity may include, for example, graphite, molybdenum disulfide, hexagonal boron nitride, tungsten disulfide and the like. Coatings for fluid contact angle modification may be intended to increase or decrease hydrophobicity and/or may improve (decrease) the tendency for gas bubbles to stick to the surface and may include, for example, biopolymers and films and the like. See, e.g., Sol-Gel Technologies for Glass Producers and Users 2004, pp. 187-194 "Hydrophilic Coating Materials" by H. Schneider, N. Niegisch, M. Mennig, and H. Schmidt, which is hereby incorporated by reference. Coatings for improving sterility may include, for example, silane-based coatings, silver-based coatings, triclosan-based coatings or other anti-microbial coatings. Coatings for light protection and/or containment (including suppressing or blocking autofluorescence) may include, for example, any material that is opaque to the wavelength(s) of interest, for example, 350-900 nm or sub-regions thereof (e.g., approximately 350-450 nm, approximately 430-530 nm, approximately 480-580 nm, and/or approximately 580-680 nm). Many metals are commonly used and may be applied by sputtering, painting, a metal particle suspension, etc. Certain metal coatings could also be used to suppress or block autofluorescence. Non-fluorescent coatings may include COC, COP, PMMA plastics and the like.

With reference to FIG. 1, an exemplary formation process 100 is depicted for forming a microfluidic flow-through element including a defined orifice region. It should be appreciated, that although FIG. 1 illustrates a flow diagram, any of the noted steps may be carried out independently, or even at the same time. The exemplary process 100 may include, for example, at step 110, forming a base substrate defining a preform for a microfluidic flow-through element (for example, forming a nozzle tip with no exit orifice).

At step 120, the base substrate may be aligned within a fixture (for example, using optical or mechanical alignment means, or both) relative to an orifice forming device. The alignment of the base substrate within the fixture may advantageously result in or enable the alignment of an electromagnetic radiation ablation device (or other orifice forming device) relative to the substrate. The alignment of the orifice may be relative to a flow path extending longitudinally within the base substrate. This flow path may be defined by an internal surface of the microfluidic flow-through element. For example, a hydrodynamic focusing region may be defined by the internal surface of the microfluidic flow-through element upstream of and just prior to the orifice region inlet. Thus, the orifice region may be aligned with respect to an upstream "wetted" surface of the base substrate. Further, it may be desirable to align the orifice region with respect to such upstream "wetted" surface such that no internal discontinuities exist in the immediate vicinity of the orifice region and/or in the immediate vicinity of the exit orifice. Alternatively, and/or additionally, the orifice region and/or the exit orifice may be aligned with respect to an external surface or feature of the microfluidic flow-through element. In such instance, the external alignment feature may also be closely controlled with respect to the internal surfaces upstream of the orifice region. Even further, should the microfluidic flow-through element be provided with mounting features (such as flats, slots, projections, etc.) that aid in the locating, centering, orienting, etc. of the microfluidic flow-through element relative to a microfluidic system, it may be preferable to locate and/or angularly orient the orifice region and/or exit orifice relative to these mounting features.

The internal, wetted surface, the external surface, and/or one or more mounting features may be keyed to a centerline of the flow stream. In fact, the internal wetted surface may be used to define the centerline of the flow stream. According to some embodiments, it may generally be sufficient to align the centerline of the orifice region and/or exit orifice to within 50 microns of the centerline of the immediately adjacent upstream internal surface. Optionally, for better control of the fluid stream and the exiting droplets, it may be desirable to more precisely align the centerline of the orifice region to the centerline of the immediately adjacent upstream internal surface. For example, aligning the orifice region centerline to within 40 microns, 30 microns, 25 microns, or even to within 20 microns of the centerline of the upstream internal surface may facilitate the creation of a well-behaved stream of droplets from the fluid stream exiting the orifice region.

Even further, having the centerline of the orifice region angularly aligned to within 20 degrees or less of the centerline of the flow stream (for example, the centerline of the immediately adjacent upstream internal surface) may minimize spray or other undesirable characteristics of the exiting stream. According to some embodiments, more closely controlling this angular alignment to within 15 degrees, 10 degrees, 5 degrees, 2 degrees, 1 degree, 0.5 degrees, 0.1 degrees or even to within 0.01 degrees may be preferable when close control of the exiting droplets is desired. Alternatively and/or additionally, angularly aligning the centerline of the orifice region to within 20 degrees, 15 degrees, 10 degrees, 5 degrees, 2 degrees, 1 degree, 0.5 degrees, 0.1 degrees or even to within 0.01 degrees of an external surface and/or mounting feature of the microfluidic flow-through element may provide sufficient useful control over the characteristics of the exiting stream and ultimately of the droplets, while at the same time facilitating manufacture.

In general, the geometry of the upstream internal surface of the microfluidic flow-through element may have any configuration and, similarly, the orifice region may be provided with any geometry. In one exemplary embodiment, the upstream internal surface of the flow path of the microfluidic flow-through element may have a conical geometry and the orifice region may have a cylindrical geometry. During the design and manufacturing processes, special attention may be paid to minimizing flow disruptions at transition regions, asymmetries, surface roughness, etc., and maintaining a consistent laminar flow within the microfluidic flow-through element.

Still referring to FIG. 1, at step 130 an orifice region (including for example, an exit orifice in a nozzle tip) may be formed using an electromagnetic radiation drilling process, for example, laser ablation and/or laser melting. In particular, the base substrate may be laser drilled to define an orifice region such as with a predefined lead-in (entrance) or lead-out (exit) geometry or both. In exemplary embodiments, the electromagnetic radiation drilling process may include focusing or directing electromagnetic radiation from one or more directions with respect to a target region or portion of the base substrate. For example, an ablation laser may be located to the inlet side of the orifice and/or to the outlet side of the orifice, and may be oriented parallel to and directed along the centerline of the orifice. Optionally, a drilling laser may be oriented at an angle to the centerline of the orifice.

Even further, the focus of the electromagnetic radiation beam source may change position and/or orientation relative to the orifice region during the orifice forming process. Accordingly, the location of the focus of a drilling laser relative to the orifice region's centerline and/or delineating surfaces may be varied during the orifice forming process. For example, the focus of the drilling laser may be moved toward and/or away from the orifice region during the laser drilling process. This relative movement may be along the centerline of the orifice region, parallel to the centerline of the orifice region, or even at an angle to the centerline of the orifice region. Optionally, the movement may be toward and/or away from the centerline of the orifice region. Further, the focus of the drilling laser may be orbited around the centerline of the orifice region (and/or around another alignment or manufacturing axis). Such an orbit may be circular, elliptical, or even non-regular. During the movement (e.g., toward, away from, orbiting, etc.) of the focus plane of the drilling laser relative to a centerline, alignment axis, and/or manufacturing axis, the angle of the drilling laser relative to the axis may remain fixed or it may vary.

According to some embodiments, the orifice region may be laser drilled from the inside of the nozzle tip or other microfluidic flow-through element (i.e., the drilling beam is traveling in the direction of fluid flow). Discontinuities where the upstream hydrodynamic focusing region meets the laser drilled orifice region may be minimized by matching the size and shape of the cross-section at the downstream end of the hydrodynamic focusing region to the size and shape of the upstream end of the laser drilled orifice region. According to other embodiments, the orifice region may be laser drilled from the exterior or outside of the nozzle tip or other microfluidic flow-through element (i.e., the laser drilling beam is traveling opposite to the direction of fluid flow). According to other embodiments, the orifice region may be laser drilled from both the inside of the base substrate/microfluidic element and from the outside of the base substrate/microfluidic flow-through element. Forming the orifice region from both ends may allow more flexibility and control over the desired geometry of the orifice region.

The cross-section of the orifice may be circular and constant along the entire length of the orifice region. The circularity of the orifice region and/or the exit orifice may be maintained to within a tolerance zone of less than 10 microns, less than 5 microns, or even less than 2 microns. The circularity of the cross-section of the orifice at the upstream end of the orifice region or a portion of the orifice region, i.e., the orifice flow entrance hole, may be maintained to within a tolerance zone of less than 10 microns, less than 5 microns, less than 2 microns, less than 1 micron or even less than 0.5 microns. Further, the surface at the upstream end of the orifice region may be chamfered or lofted to provide a smooth transition from the flow path or hydrodynamic focusing region defined by the base substrate. According to some embodiments, the circularity of the cross-section of the orifice at the downstream end, i.e., the exit orifice or hole, of the orifice region may be maintained to within a tolerance zone of less than 10 microns, less than 5 microns, less than 2 microns, less than 1 micron or even less than 0.5 microns. The periphery of the downstream exit hole of the orifice region may be chamfered or provided with rounded edges. Optionally, the periphery of the downstream orifice or exit hole of the orifice region may be provided as a sharp, non-chamfered edge. The geometry of the orifice or exit hole of the orifice region, including its sharpness and freedom from discontinuities and/or flaws, may affect the accuracy and cleanness of jet and droplet formation and subsequent travel.

According to certain embodiments, the minimum cross-sectional area of the orifice region may have a circular cross-sectional shape with a diameter within the range of approximately 10 microns to approximately 500 microns, more preferably between approximately 25 microns and approximately 250 microns and most preferably between approximately 50 microns and approximately 150 microns. For some embodiments, the orifice may have a diameter of less than or equal to 100 microns. For other embodiments, the orifice may have a diameter of less than or equal to 90 microns or even less than or equal to 50 microns. One preferred orifice diameter may be 70 microns. Another preferred orifice diameter may be 85 microns. The orifice diameter may vary by plus and/or minus 10%, but may preferably vary by only plus and/or minus 5%. Further, flaws or imperfections in the orifice may be limited to features having a maximum dimension of less than 5 microns, less than 3 microns, or even less than 2 microns.

According to certain embodiments, the orifice region may have a length within the range of 50 to 500 microns. Depending upon the characteristics of the fluid stream and the particles, it may be desirable to limit the length of the orifice region to less than 400 microns, less than 300 microns, or even less than 200 microns. Additionally, it may be desirable for the length of the orifice region to be at least 75 microns, at least 100 microns, or even at least 125 microns. According to some embodiments, control over the fluid stream may be achieved with an orifice region having a length between 100 to 200 microns.

According to other embodiments, if the orifice region is formed with an upstream portion having a first geometry and a downstream portion having a second, different geometry, then it may be desirable to control the length of the downstream portion. For example, if the upstream portion were to have a substantially funnel-shaped or other converging geometry and a downstream portion were to have a substantially cylindrical or other non-converging geometry, then it may be desirable to control the length of the downstream portion to less than 250 microns, less than 200 microns, or even less than 175 microns, but at least 75 microns. According to some embodiments, sufficient control over the fluid stream may be achieved with a non-converging downstream portion of the orifice region having a length between 75 and 150 microns.

In some aspects, the microfluidic element may be unitarily-formed. As used herein, "unitarily-formed" refers to a process wherein the element is formed from a single, monolithic piece of material. For example, a microfluidic element that has a base substrate or body formed in an injection molding process may be considered to be unitarily-formed. Similarly, a microfluidic element having a body formed in stamping process or a single 3-D printing process may be considered to be unitarily-formed. In contrast, a microfluidic element having a separate jewel-nozzle orifice assembled to a previously formed hydrodynamic focusing element would not be considered to be unitarily-formed. Further, a microfluidic element having a separate jewel-nozzle orifice overmolded to a hydrodynamic focusing element would not be considered to be unitarily-formed. A unitarily-formed element may have subsequent machining performed on it, such as drilling or ablating holes, polishing, chamfering, deburring, or otherwise removing material from the monolithic piece of material, and it may still be considered to be unitarily-formed. Further, a unitarily-formed element may be formed with a plurality of other unitarily-formed elements and then subsequently separated therefrom. Even further, for purposes of this disclosure, coatings or other surface treatments do not convert an otherwise unitarily-formed element into a non-unitarily-formed element—rather, the unitarily-formed element now has a coating applied to it.

According to some embodiments, a unitarily-formed microfluidic flow-through element may include a body defining an internal fluid surface. The internal fluid surface of the unitarily formed body may include a converging flow path, a non-converging flow path and a transition region therebetween. The converging flow path may be configured for laminar flow. Further, for example, the converging flow path may be formed as a hydrodynamic focusing region when the base substrate of the microfluidic flow-through element is unitarily formed. The non-converging flow path may be located downstream of the converging flow path and may dimensionally restrict the converging flow path. For example, the non-converging flow path may be formed as an orifice region or a portion of an orifice region that is laser ablated from the unitarily-formed base substrate. The transition region provided between the converging flow path and the non-converging flow path may be configured to maintain a laminar flow. The transition region or a portion thereof may be formed when the base substrate is formed. Optionally, the transition region or a portion thereof may be formed when the orifice region is formed. In certain embodiments, the unitarily-formed body may be formed by injection molding a polymeric material. As one example, the polymeric material may be a low autofluorescence polymeric material having a Vickers hardness less than 500.

According to certain embodiments, the base substrate of the microfluidic element may be formed to include a chamber, cavity, channel, etc. having an open terminal end and a closed terminal end, for example, opposite the open terminal end. The base substrate of the microfluidic element may further be formed to define an incipient flow-path, i.e., a partially formed flow-path or a flow-path that requires further shaping or forming, between the open terminal end and the closed terminal end. The base substrate of the microfluidic element may further be formed to define an incipient orifice, i.e., a partially formed orifice or an orifice that requires further shaping or forming, in the terminal end opposite the flow-path's entrance into the microfluidic element. In some embodiments, at step 130, an ablation process may be used to define an orifice region through the closed terminal end, for example, by directing or focusing electromagnetic radiation on a first surface of the closed end terminal, for example, on a downstream surface of the closed end from the side of the base substrate adjacent to the closed terminal end, on a second surface of the closed terminal end, for example, on an upstream surface of the closed end from the side of the base substrate adjacent to the open terminal end, or from both sides.

Still referring to FIG. 1, in some exemplary embodiments, the process 100 may further include additional post processing steps 140, such as material removal, curing, contouring or shaping, machining, chemical treatments, surface treatments, including, but not limited to, washing, coating, glazing, sterilizing, laser etching, laser detailing, packaging or sterilization, or other post molding processes. In some embodiments, a formed microfluidic flow-through element may be sterilized before or after packaging or both, for example, using gamma radiation, gas treatments, vapor and/or fluid exposure, temperature, or other sterilization techniques. The packaging may advantageously preserve the sterility of the formed microfluidic flow-through element.

Figure 2:
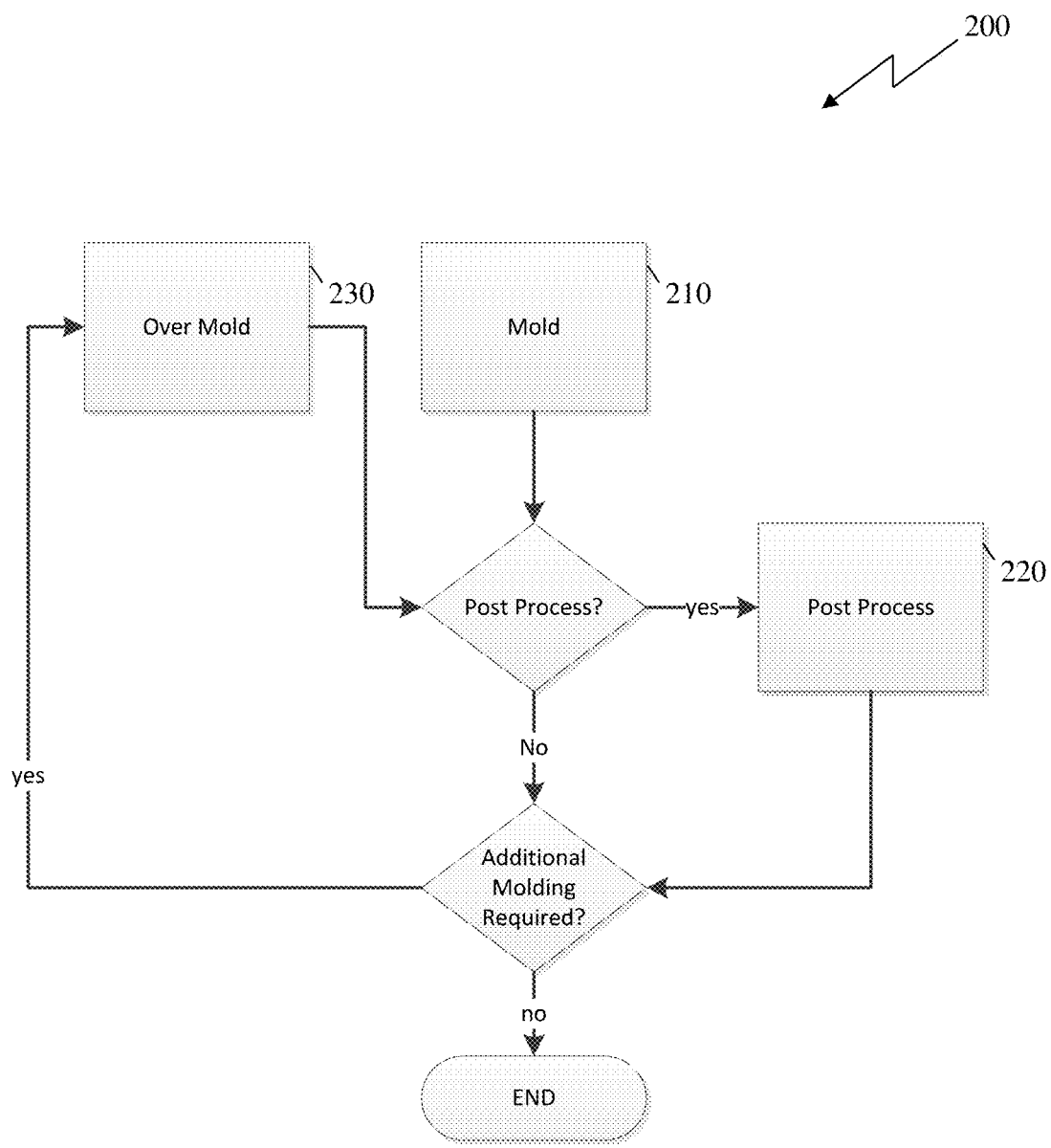
FIG. 2 depicts a flow chart of a further exemplary process for forming a microfluidic flow-through element, according to aspects of the present disclosure.

With reference to FIG. 2, a flow chart illustrates an exemplary process 200 for forming a microfluidic flow-through element, for example, for forming a nozzle assembly. It should be appreciated, that although FIG. 2 illustrates a flow diagram, any of the noted steps may be carried out independently, or even at the same time. A base substrate for the microfluidic flow-through element or for a component thereof may be molded at the step designated "Mold" 210. By way of a non-limiting example, a preform having the basic shape of the microfluidic flow-through element or one or more components thereof may be molded at this step by an injection molding technique, such as by thermoplastic injection molding or by thermoset injection.

In the case of thermoplastic injection molding, a mold constructed from two or more cooperating sections forms a cavity having the desired shape. Molten resin may be fed into that cavity under pressure and allowed to cool. Other molding techniques, such as transfer molding, compression molding, thermoforming, and other similar techniques may also be used. The material for molding may be selected from plastic, resins, plastomer, epoxy, phenolic, polycarbonate, Pyrolytic carbon (PYC), Diammonium phosphate (DAP) and thermoplastics such as nylon, acetal, Polybutylene terephthalate (PBT), Polyphenylene oxide, Polyphenylene sulfide, or other similar materials, including, for example, COC, COP, PMMA plastics as mentioned above. Those familiar in the art would be aware that other suitable polymers or other moldable materials, such as, for example, composites including polymers, ceramic, glasses, etc. may be used herein. Although the step 210 is labeled "Mold," it is also intended to encompass fused deposition molding, such as in a 3-D printer (available from Stratasys, Edina, Minn., US), or other additive manufacturing processes.

According to some embodiments, the initial molding step 210 for the substrate or preform of the microfluidic flow-through element may include supplying one or more auxiliary nozzle assembly components at least partially within the molding cavity, filling the mold cavity with the material-to-be-molded, and curing the material with the one or more auxiliary nozzle assembly components molded therewith. Auxiliary nozzle assembly components may include, for example, an injection tube, an oscillating element, a piezoelectric element, a nozzle housing, a charge pin, an electrical cable, an electrical connector, a nozzle alignment mechanism, a particle alignment mechanism, a sheath inlet connector, a sheath inlet tube, a sample inlet connector, a waste tube, a metallic element, a ceramic element, an optical window or other optical element, a fastener, a seating element, etc.

Following the initial molding step 210, the formed substrate may undergo post processing in step 220. Post processing may include various processes, including, but not limited to, washing, curing, machining, coating, glazing, sterilizing, chemical treatments, laser etching, laser detailing, finishing processes, or other post molding processes. As one example, an iteration of the post processing step 220 may include the step of laser drilling (for example, laser drilling) an orifice region in a base substrate of the microfluidic flow-through element or in a component thereof (for example, step 130 if FIG. 1). Post processing step 220 may further include packaging and/or sterilization steps.

In exemplary embodiments, the substrate formed in the molding step 210 may, prior to or after post processing 220, be subject to additional molding, for example over molding, at step 230. Over molding may generally involve a second component of a microfluidic flow-through element, being molded with respect to a previously formed first component, substrate, and/or preform of the microfluidic flow-through element. By way of an example, a complimentary second piece of a nozzle assembly may be over molded with respect to a first piece of a nozzle assembly, for example, with respect to a nozzle tip of a nozzle assembly. This process may also be referred to as insert molding, by virtue of inserting a previously formed component of the microfluidic flow-through element into the mold. The over molding process may also include co-molding wherein two previously formed components, substrates, or preforms of components of the microfluidic flow-through element are placed into the mold and co-cured.

Nozzle assembly components which may be over molded relative to a nozzle tip may include, for, example, an injection tube, an oscillating element, a piezoelectric element, a nozzle housing, a charge pin, an electrical cable, an electrical connector, a nozzle alignment mechanism, a particle alignment mechanism, a sheath inlet connector, a sheath inlet tube, a sample inlet connector, a waste tube, a metallic element, a ceramic element, an optical window or other optical element, a fastener, a seating element, etc. Any, or all, of the components of the microfluidic flow-through element, may be molded or formed contemporaneously with the steps described, may be pre-fabricated or may even be obtained from off the shelf sources. Following any molding step 230 or iteration thereof, the formed substrate may undergo post processing in step 220 such as described above.

Once all molding and post processing iterations have been completed, process 200 terminates at the step designated "END." A final result of the process 200 may include a microfluidic flow-through element or component thereof which includes an orifice region defined in post processing 220. For example, process 200 may yield a nozzle assembly or nozzle tip defining an exit orifice region.

In the illustrated embodiment, the microfluidic flow-through elements and methods for forming or using the same may involve forming an orifice region in a microfluidic element using focused electromagnetic energy (for example, laser drilling). This laser drilling process may occur prior, during, or after the formation of the base substrate or preform of the microfluidic flow-through element or a component thereof. Using a laser drilling process to define the orifice region advantageously enables the volume of material removed to be precisely sized, shaped and located.

An illustration of an embodiment of this process is depicted in FIGS. 3A-3C. In FIG. 3A, an exemplary base substrate 300 of a microfluidic flow-through element (depicted as an unfinished nozzle tip) is provided. The base substrate may have been formed by one or more techniques, such as described above with respect to FIG. 2, and including but not limited to injection molding, stamping, and/or 3-D printing. As depicted, the base substrate 300 includes an upstream terminal end 310 opposite a downstream terminal end 320. At this stage, upstream end 310 is open and downstream end 320 may be closed, substantially closed or partially open. One or more interior wall surfaces extend from the upstream terminal end 310 to the downstream terminal end 320 thereby defining an incipient flow path 330 between the upstream and downstream terminal ends.

The walls of the defined flow path 330 may provide a smooth, continuous, span between the terminal ends. As shown in FIG. 3A, the walls may extend linearly from the upstream to the downstream end. Optionally (not shown), the walls may be provided with a constant curvature, a monotonically increasing curvature, a monotonically decreasing curvature, a stepwise change in slope, or any other smoothly varying slope or curvature. In general, the walls defining a smoothly transitioning flow path will not have disruptive steps or other abrupt discontinuities. This smooth flow path may serve to form and/or maintain a laminar flow of the fluidic stream or otherwise shape and/or control the velocity and/or pressure profiles of the fluidic stream. Further, the walls of the flow path 330 may serve to orient the particles or cells within the fluidic stream.

According to some aspects, the cross-sectional shape of the flow path 330 may be circular, elliptical, ovoid, polygonal, etc. Further, the cross-sectional shape of the flow path 330 may be constant along the length of the flow path 330. Even further, the cross-sectional shape of the flow path 330 may be constant along the length of the flow path 330, but the cross-sectional area may change along the length of the flow path. Thus, for example, as shown in FIG. 3A, in some embodiments, the defined flow path may be substantially conical, for example, to facilitate focusing a fluidic stream towards the downstream terminal end 320. According to other aspects, the cross-sectional shape may have major and minor axes of different lengths (e.g., an elliptical or ovoid shape) wherein the relative lengths of the major and minor axes vary along the length of the flow path. As one example, the cross-sectional shape may smoothly change from an elliptical-type cross-section have a major-to-minor axes ratio of less than 0.9, less than 0.8, less than 0.7, or even less than 0.6 at the upstream end to circular at the downstream end. According to even other aspects, the angular position of a major axis of a non-circular cross-sectional shape may rotate around a centerline of the flow path 330. Thus, as a non-limiting example, the upstream end of the base substrate 300 may be formed with an elliptical cross-section having its major axis oriented at zero degrees, while the downstream end of the microfluidic flow-through element may be formed with an elliptical cross-section having its major axis oriented at forty-five degrees. The change in the rotational orientation of the major axis may be constant along the length of the flow path 330 or it may decrease or increase as the flow path approaches the downstream end. Further, the change in the rotational orientation of the major axis need not be 45 degrees, but may range from a very slight change of from two to three degrees to more than ninety degrees.

In FIG. 3B, a laser or other electromagnetic radiation beam 400 may be targeted and focused with respect to the base substrate 300, for example with respect to the downstream terminal end 320 of the base substrate 300. As shown in FIG. 3C, the laser beam 400 may be used to form an orifice region 550 in the base substrate 300, for example, traversing or extending through the downstream terminal end 320, and thereby creating a microfluidic flow-through element 500. As noted above, with respect to FIG. 1, the process by which this orifice region 550 is created may involve locating the base substrate 300 within a fixture or other mechanical retaining element (not shown), for example so as to align the base substrate 300 with respect to the laser beam 400. The resulting microfluidic flow-through element 500 is depicted in FIG. 3C with an orifice region 550 which may include a predetermined lead-out or exit geometry 510 or predetermined lead-in or entrance geometry 520 or both. The orifice region 550 may, for example, define a transitional radius, taper, loft, or other blending profiles, geometries or geometrical cross-sectional shapes at the transition of the flow path 330 or hydrodynamic focusing region 530 to the orifice region 550.

As noted above, the base substrate 300 (and thereby the microfluidic flow-through element 5000 may be formed from one or more of a number of suitable materials (synthetic or naturally occurring). In one embodiment, the base substrate 300 may be fabricated from a polymeric substrate. As also noted above, forming of the base substrate 300 may include using an injection mold or other suitable forming apparatus, for example, a 3-D printer and may ensure that a certain wall thickness, transition geometry, or other predetermined feature (for example, an alignment structure) is present for the aperture/orifice formation process.

As a non-limiting example, the base substrate 300 may be characterized by one or more walls, for example a wall defining a downstream terminal end 320, having a thickness greater than 50 microns and/or less than 2.0 mm, preferably between 100 and 400 microns, or in some embodiments, between 100 and 300 microns. For example, the thickness of the wall of the base substrate 300 forming the downstream terminal end 320 may be greater than or equal to approximately 50 microns (e.g., 50 microns plus/minus 5 microns), approximately 100 microns (e.g., 150 microns plus/minus 10 microns), approximately 150 microns (e.g., 150 microns plus/minus 15 microns), approximately 200 microns (e.g., 200 microns plus/minus 20 microns), or approximately 250 microns (e.g., 250 microns plus/minus 25 microns).

Furthermore, an internal surface geometry of the flow path 330 and/or hydrodynamic focusing region 530 provided by the microfluidic flow-through element 500 upstream of the orifice region 550 may be generally convergent, for example, conical (i.e., having linearly convergent walls), parabolic (i.e., having concavely convergent walls), funnel-shaped (i.e., having convexly convergent walls), piece-wise convergent (i.e., having a combination of linearly, concavely and/or convexly convergent regions). The cross-sectional shape of the flow path 330, taken perpendicular to a centerline of the flow path 330, may be circular, elliptical, square, or some other symmetric, asymmetric, rotationally symmetric, regular and/or irregular shape. The shape, orientation, and/or area of the cross-section shape of the flow path may vary or change along the longitudinal length of the flow path. The profile of the flow path 330 or hydrodynamic focusing region 530 may be implemented to optimize the fluidic performance characteristics of the microfluidic flow-through element 500. Alternative geometries may be used that are well suited for particular particle types flowing through the microfluidic flow-through elements. In a non-limiting example, particle or cell orienting features may be formed during a primary or secondary formation step, for example during molding of a base substrate 300 or during post processing thereof. For example, the general shape of the flow path 330 may be defined during an injection molding step and a subsequent post-processing step may be used to modify the surface of the flow path (e.g., polishing, coating, texturing, etc.).

Thus, according to certain aspects, the internal surface geometry of the flow path 330 of the base substrate 300 may provide a hydrodynamic focusing region 530 upstream of the orifice region 550 formed in the microfluidic flow-through element 500. In some embodiments, elliptical and/or fluidic torsional regions that apply forces to particles in a particular manner may be formed for orienting sperm cells or other asymmetric or symmetric particles. For example, a fluidic torsional region may generate single torsional hydrodynamic forces having a hydrodynamic axis when a flow containing a particle sample stream passes through it. When the sample stream passes through this fluidic torsional region, particles within the sample may become radially aligned with respect to the hydrodynamic axis. The fluidic torsional region may also cause the sample to accelerate and/or increase the separation of individual particles within the sample.

The overall shape of the fluidic torsional region may gradually taper as it extends downstream. The taper may be constant (i.e., linear) or varying (i.e., non-linear or curved). Further, the degree of curvature of the internal surface within the fluidic torsional region need not be constant. According to some embodiments, the fluidic torsional region may be gradually and continually tapered, and the cross-sectional areas may monotonically decrease as the fluidic torsional region extends downstream.

The tapered fluidic torsional region may be provided with a generally "elliptical" cross-section (i.e., a cross-section having a major axis and a minor axis that are not equal). The shape of the generally "elliptical" or elongated cross-section need not be constant as the fluid torsional region tapers as it extends downstream. According to certain embodiments, the ratio of the major to the minor axis may change and/or the curvature along the "elliptical" perimeter in the plane of the cross-section may change. For example, at the most upstream end of the fluidic torsional region, the cross-section may be generally circular. As the fluidic torsional region extends toward the downstream end, the cross-sectional shape may first become more elliptical (i.e., the ratio of the major to minor axis may become larger), and then become less elliptical (i.e., the ratio of the major to minor axis may become smaller), until at the most downstream end of the fluid torsional region (i.e., at the entry to the orifice region) the cross-sectional shape has become substantially circular.

Figure 4A:
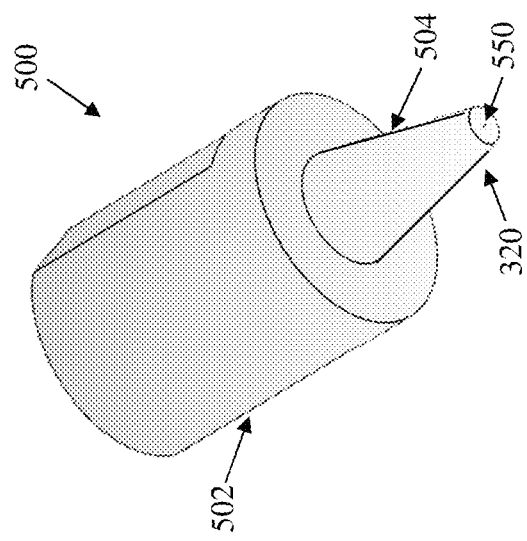
FIGS. 4A and 4B illustrate an exemplary microfluidic flow-through element before and after formation of an orifice region according to aspects of the present disclosure.
Figure 4B:
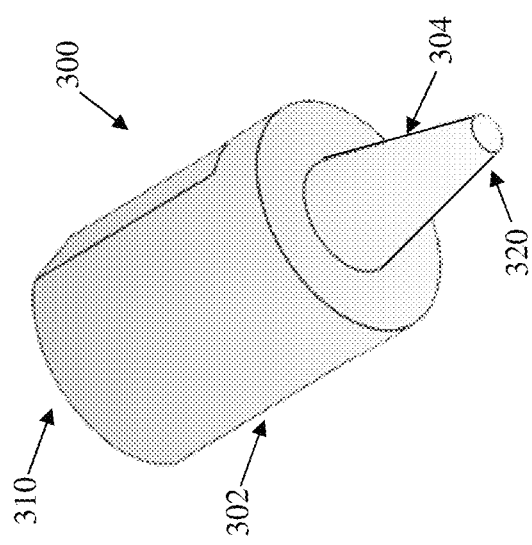

Referring now to FIGS. 4A and 4B, a base substrate 300 for an exemplary flow-through element 500 (illustrated as a nozzle tip) is depicted in FIG. 4A and the microfluidic flow-through element 500, i.e., the base substrate 300 after it has been subjected to a secondary processing step of orifice formation (via laser drilling, for example) to form an orifice region 550, is depicted in FIG. 4B. The base substrate 300 includes an open upstream end 310 (not visible in this view) opposite a closed downstream end 320. One or more side walls extend from the open upstream end to the closed downstream end thereby defining an incipient flow-path between the upstream and downstream ends. As depicted in FIGS. 4A and 4B, the base substrate 300 and the microfluidic flow-through element 530 may be formed with a substantially cylindrical or other non-tapered outer wall section 302, 502, respectively, adjacent to the upstream end 310 and a substantially conical or other tapered outer wall section 304, 504, respectively, tapering toward the downstream end 320. The non-tapered outer wall section 502 may facilitate association of the microfluidic element with a microfluidic system.

As described above, in some embodiments, the base substrate may define an internal flow path 330 or channel between the upstream end 310 and the downstream end 320 characterized by a substantially cylindrical geometry or other non-tapered geometry, a substantially conical geometry or other tapered geometry, a substantially cylindrical geometry or other non-tapered geometry followed by a substantially conical geometry or other tapered geometry, or other combinations thereof.

The resulting microfluidic flow-through element 500 depicted in FIG. 4B includes an orifice region 550 traversing the previously-closed downstream end 320. As discussed above, the orifice region 550 may include a predetermined lead-out geometry or lead-in geometry or both, such that the cross-section of the orifice region 550 is not constant, but rather varies along its flow length.

With reference to FIGS. 5A-5F, top view at upstream end (FIG. 5A), bottom view at downstream end (FIG. 5B), front view (FIG. 5C), side view (FIG. 5D), cross-sectional view (FIG. 5E) and zoomed in cross-sectional view (FIG. 5F) of an exemplary microfluidic flow-through element 500 (illustrated as a nozzle tip) are depicted. As depicted, the microfluidic flow-through element 500 includes an open, upstream terminal end 310 opposite a downstream end 320 with an orifice region 550 formed therein. As noted above, one or more walls may extend from the upstream end 310 to the orifice end 320 thereby defining a flow-path 330 between the open terminal and orifice ends. Flow path 330 may be a hydrodynamic focusing region 530. As depicted in FIG. 5C, the body of the microfluidic flow-through element 500 may be formed of a substantially cylindrical section 502 toward the open end 310 and a substantially conical section 504 tapering toward the orifice end 320. As depicted in FIG. 5E, microfluidic flow-through element 500 defines a flow path 330 and or hydrodynamic focusing region 530 between the open end 310 and the orifice region 550 characterized by a substantially conical geometry. According to certain embodiments, the cone or internal angle $\alpha$ may range from between 15 and 45 degrees. In the embodiment of FIGS. 5A-5F, the cone angle $\alpha$ is approximately 23 degrees.

The overall dimensions of microfluidic element 500 may be on the order of centimeters or, preferably, millimeters. For example, the microfluidic element may be approximately 13 mm in length extending from the open end 310 to the orifice end 320 (for example, approximately an 8 mm length along the substantially cylindrical section 502 and approximately a 5 mm length along the substantially conical section 504) and may have a maximum outer width or diameter of approximately 6 mm (for example, at the cylindrical section 502).

In exemplary embodiments, microfluidic flow-through element 500 and/or its base substrate 300 may include alignment aids, e.g., optical or mechanical elements (for example, slots, flanges, coating strips and the like) for facilitating alignment thereof with an electromagnetic beam for laser drilling (or other orifice forming devices or means) and/or for facilitating alignment with and mounting into a microfluidic system. As depicted in FIG. 5C, microfluidic flow-through element 500 may include one or more shoulder flanges 342 that radially extend from opposite sides of the cylindrical section 502. The shoulder 342 may be formed at one end of the cylindrical section 502, for example toward the conical section 504. Microfluidic flow-through element 500 and/or its base substrate 300 may also include one or more recessed or flattened regions 344, for example, on opposite sides of the cylindrical section 502 (see FIGS. 5C and 5D). Shoulder flanges 342 and/or recessed or flattened regions 344 may be used for facilitating alignment thereof with an electromagnetic beam for laser drilling and/or for facilitating alignment with a microfluidic system.

FIG. 5E depicts a cross-sectional view of the microfluidic flow-through element 500 in FIG. 5D taken along line A-A. As shown in FIG. 5E, the microfluidic flow-through element 500 may generally be formed to define a tapered or converging flow-path 330 leading into the orifice region 550.

A magnified view of the orifice region 550 in FIG. 5E is depicted in FIG. 5F. As depicted, the exemplary orifice region 550 includes a downstream portion 510 having a non-tapered lead-out geometry and an upstream portion 520 having a tapered lead-in geometry. Other entrance and/or exit geometries may be provided. For example, the upstream portion 520 of the orifice region 550 may be generally convergent, for example, conical (i.e., having linearly convergent walls), parabolic (i.e., having concavely convergent walls), funnel-shaped (i.e., having convexly convergent walls), piece-wise convergent (i.e., having a combination of linearly, concavely and/or convexly convergent regions), etc. The cross-sectional shape of the upstream portion 520 of the orifice region 550, taken perpendicular to the centerline of the flow path 330, may be any suitable shape. In general, a circular cross-section that smoothly tapers to meet a circular cross-section of a downstream portion 510 of the orifice region 550 may be preferred. The profile of the upstream portion 520 of the orifice region 550 may be designed to maintain and/or optimize the laminar transition of the flow from a hydrodynamic focusing region 530 to the downstream portion 510 of the orifice region 550.

With reference to FIGS. 6A-6E, top view (FIG. 6A), bottom view (FIG. 6B), front view (FIG. 6C), side view (FIG. 6D), and cross-sectional view (FIG. 6E) of a further exemplary microfluidic flow-through element 500 (depicted as a nozzle tip) are depicted. As compared to the embodiment of FIGS. 5A-5E, the microfluidic flow-through element 500 in FIG. 6 advantageously may include an externally tapered, beveled, or chamfered distal end 320. The chamfer 350 may be provided around the entire peripheral edge of the downstream end 320 or just along portions of the peripheral edge.

Figure 7B:
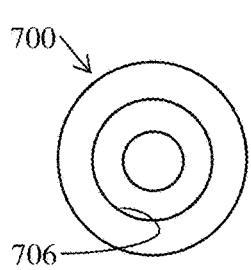
FIGS. 7A and 7B illustrate an exemplary base substrate for a microfluidic flow-through element according to aspects of the present disclosure.
Figure 7A:
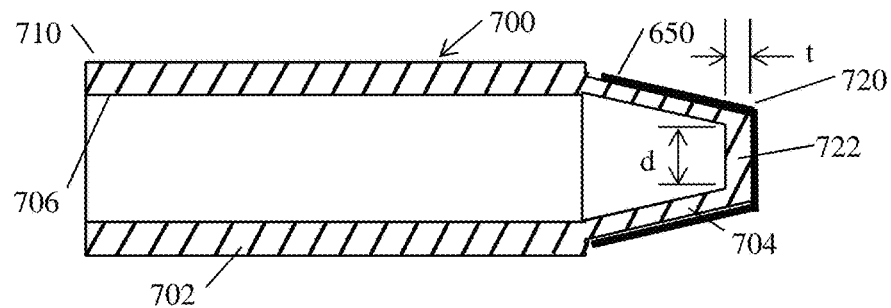

FIGS. 7A and 7B illustrate another embodiment of a base substrate 700 for a microfluidic flow-through element. Base substrate 700 includes an upstream end 710, a downstream end 720, a first body portion 702 generally formed as a cylinder and a second body portion 704 generally formed as a truncated cone. Upstream end 710 is open. Downstream end 720 is provided with an end wall 722 having a thickness t and a characteristic dimension (generally, a diameter) d extending between the inner surface side walls. In general, the thickness and the diameter of the end wall 722 may be any value. In certain preferred embodiments, e.g., for microfluidic droplet generation, the thickness t of the end wall 722 may be 100 microns plus/minus 50 microns and the diameter d may be 75 microns plus/minus 15 microns.

An internal, incipient flow path 706 extends from the upstream end 710 to the wall 722 at the downstream end 720. In this particular embodiment, flow path 706 has a constant diameter along its length within the first body portion 702 and a tapering diameter along its length within the second body portion 704. The diameter of the second body portion 704 where it meets the first body portion 702 is the same as the constant diameter of the first body portion 702.

As disclosed above, the base substrate 700 may be molded or machined from a relatively soft material. Further, as disclosed above, the material of the base substrate 700 may have a low autofluorescence characteristic. Additionally and/or alternatively, a coating 650 for blocking or suppressing autofluorescence may be provided.

One or more surfaces of the flow path 706 may provide an alignment guide for subsequently forming an orifice in the end wall 722. For example, the diameter of the flow path 706 within the first, cylindrical, body portion 702 may provide an alignment circle for accurately positioning an ablating laser beam.

FIGS. 8A-8E illustrate various energy beam configurations that may be used to form an orifice 750 in the end wall 722 of the base substrate 700, thereby forming the microfluidic flow-through element 740 with flow path 746. Thus, microfluidic flow-through element 740 includes an upstream end 710, a downstream end 720, a first body portion 702 generally formed as a cylinder and a second body portion 704 generally formed as a truncated cone. Both upstream end 710 and downstream end 720 of the microfluidic flow-through element 740 are open, thereby allowing fluid to flow through flow path 746 of microfluidic element 740.

Figure 8A:
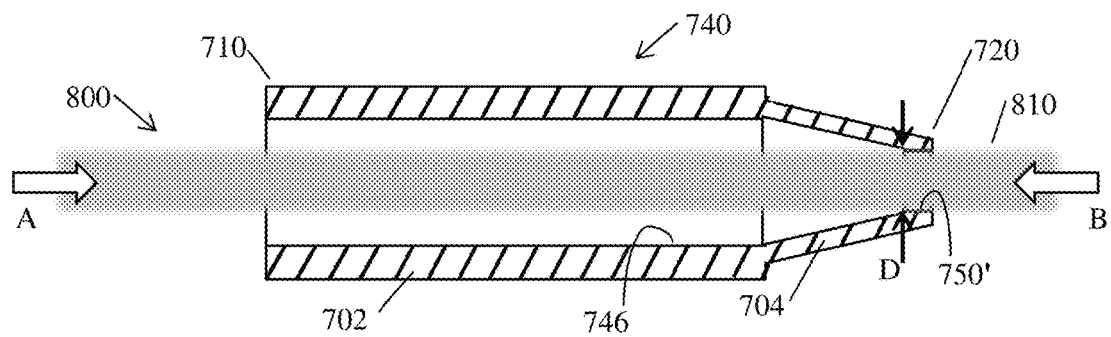
FIGS. 8A-8E illustrate various exemplary energy beam shapes for forming and shaping a nozzle in the base substrate of FIGS. 7A and 7B according to aspects of the present disclosure.

FIG. 8A illustrates an energy beam 800 of constant cross-section (e.g., a collimated laser beam 810) forming a constant cross-section orifice in the downstream end 720 of the microfluidic flow-through element 740. The cross-section diameter D (or other characteristic dimension) of the energy beam 800 may be greater than a diameter d (or other characteristic dimension) of the end wall 722 of the base substrate 700 (see FIG. 7A). When the beam diameter D is greater than the end wall diameter d, discontinuities at the transition from the molded flow path surfaces of the base substrate to the ablated orifice region surfaces are minimized or even eliminated. In contrast, if the beam diameter D is less than the end wall diameter d, an annular portion of the end wall will remain after formation of the orifice, thereby forming a step or other discontinuity at the transition from the molded flow path surfaces to the ablated orifice region surfaces are minimized or even eliminated. The "oversized" energy beam ensures end wall 722 is completely removed and that the surfaces of the flow path 746 will smoothly and continuously transition to the surfaces of the orifice.

Further, the energy beam 800 may be directed in a downstream direction (see arrow A) such that the energy beam 800 impinges on the inner surface of the flow path 706/746 within the second body portion 704 and forms a continuous, smooth transition to the orifice 750. Alternatively, the energy beam 800 may be directed in an upstream direction (see arrow B) such that the energy beam 800 impinges on end wall 722 of the base substrate 700 first and then reaches the inner surface of the flow path 706/746 within the second body portion 704 to form a continuous, smooth transition from the orifice 750' to the flow path. Orifice 750' has a constant cross-sectional area along its length.

Figure 8B:
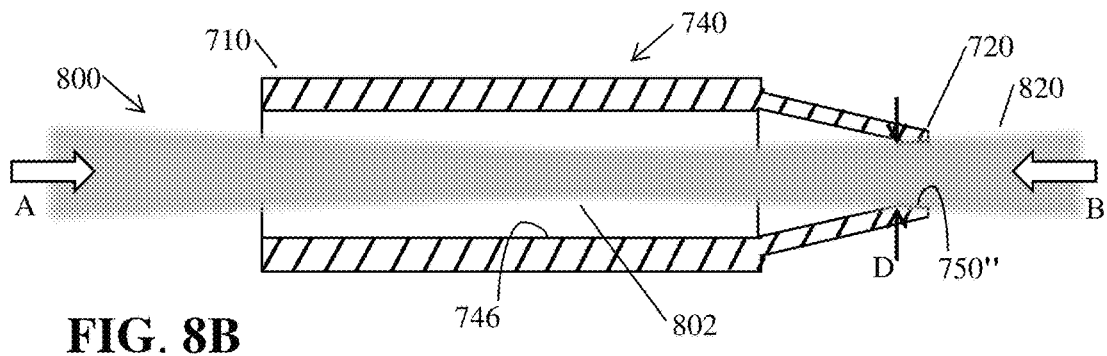

FIG. 8B illustrates an energy beam 800 that diverges as it exits the orifice 750" traveling in a downstream direction (arrow A). Thus, as shown, energy beam 800 may be a laser beam 820 that is focused in a focal plane 802 positioned upstream of the downstream end 720 of the microfluidic flow-through element 740. The cross-section diameter D of the energy beam 800 that impinges upon the upstream surface of the end wall 722 when the laser beam 820 is directed downstream (arrow A) may be greater than a diameter d of the end wall 722 of the base substrate 700 (see FIG. 7A). The energy beam 800 may form a continuous, smooth transition from the flow path 706/746 within second body portion 704 to the orifice 750". Alternatively, the energy beam 800 may be a converging energy beam that is directed in an upstream direction (see arrow B) such that the energy beam 800 impinges on end wall 722 of the base substrate 700 first and then reaches the inner surface of the flow path 706/746 within the second body portion 704 to form a continuous, smooth transition from the orifice 750''' to the internal surface of flow path 746. With respect to the direction of fluid flow (arrow A), orifice 750''' is a diverging orifice.

Figure 8C:
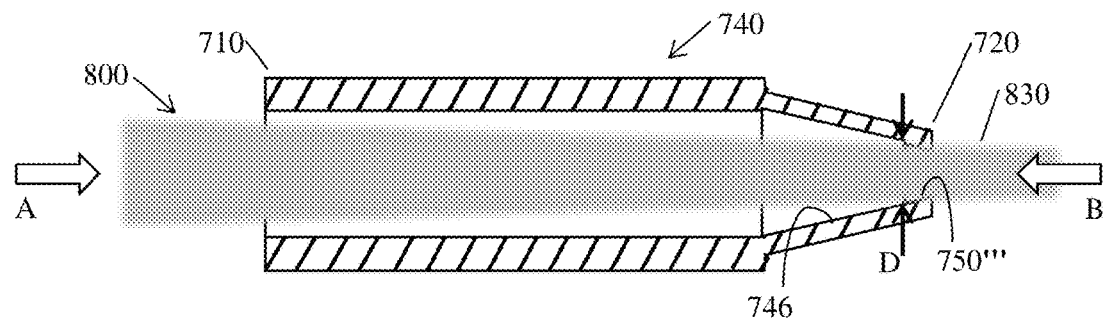

FIG. 8C illustrates an energy beam 800 that converges as it exits the orifice 750''' traveling in a downstream direction (arrow A). Thus, as shown, energy beam 800 may be a laser beam 830 that is focused in a focal plane (not shown) that is downstream of the downstream end 720 of the microfluidic flow-through element 740. The cross-section diameter D of the energy beam 800 in the plane of the upstream surface of the end wall 722 may be greater than a diameter d of the end wall 722 of the base substrate 700. Thus, the energy beam 800 may form a continuous, smooth transition from the flow path 706/746 within second body portion 704 to the orifice 750'''. Alternatively, the energy beam 800 may be a converging energy beam that is directed in an upstream direction (see arrow B) such that the energy beam 800 first impinges on end wall 722 of the base substrate 700 and then reaches the inner surface of the flow path 706/746 within the second body portion 704 to form a continuous, smooth transition from the orifice 750''' to the internal surface of flow path 746. With respect to the direction of fluid flow (arrow A), orifice 750''' is a converging orifice.

Figure 8D:
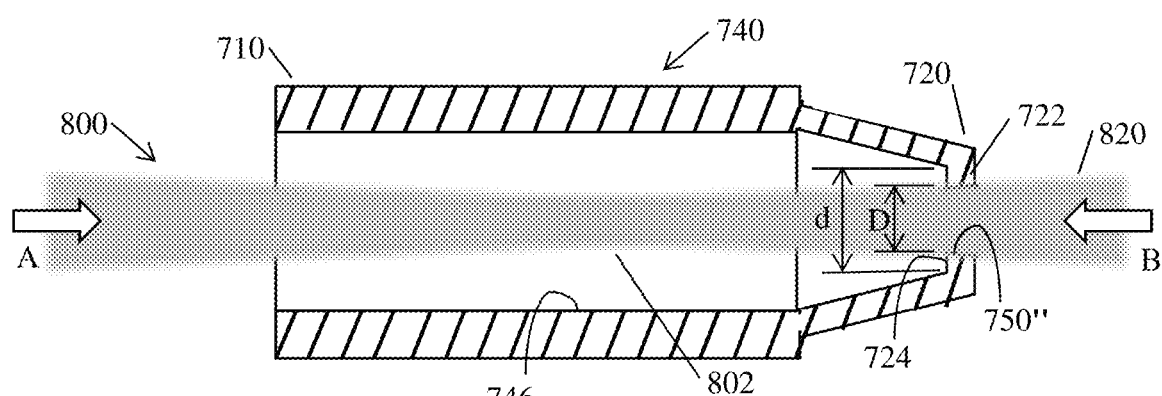

Similar to FIG. 8B, FIG. 8D illustrates an energy beam 800 embodied as a laser beam 820 that travels in a downstream direction (arrow A) and diverges as it exits the orifice 750'' or that travels in an upstream direction (arrow B) and converges as it exits the orifice 750''. In this particular embodiment, the cross-section diameter D of the laser beam 820 that impinges upon the upstream surface of the end wall 722 when the laser beam 820 is directed downstream (arrow A) may be less than a diameter d of the end wall 722. Thus, this embodiment has a discontinuity 724 (for example, a shoulder) where the end wall 722 meets the internal surface of the flow path 746. With respect to the direction of fluid flow (arrow A), orifice 750'' is a diverging orifice.

Figure 8E:
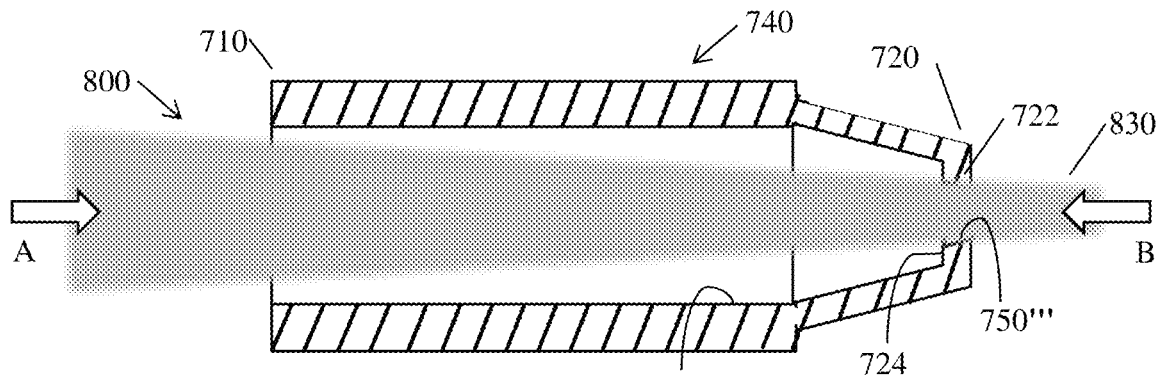

Similar to FIG. 8C, FIG. 8E illustrates an energy beam 800 embodied as a laser beam 830 that travels in a downstream direction (arrow A) and converges as it exits the orifice 750''' or that travels in an upstream direction (arrow B) and diverges as it exits the orifice 750'''. As with the embodiment of FIG. 8D, the cross-section diameter D of the laser beam 830 that impinges upon the upstream surface of the end wall 722 when the laser beam 830 is directed downstream (arrow A) may be less than a diameter d of the end wall 722. Thus, this embodiment also has a discontinuity 724 or shoulder where the end wall 722 meets the internal surface of the flow path 746. With respect to the direction of fluid flow (arrow A), orifice 750''' is a converging orifice.

Figure 9A:
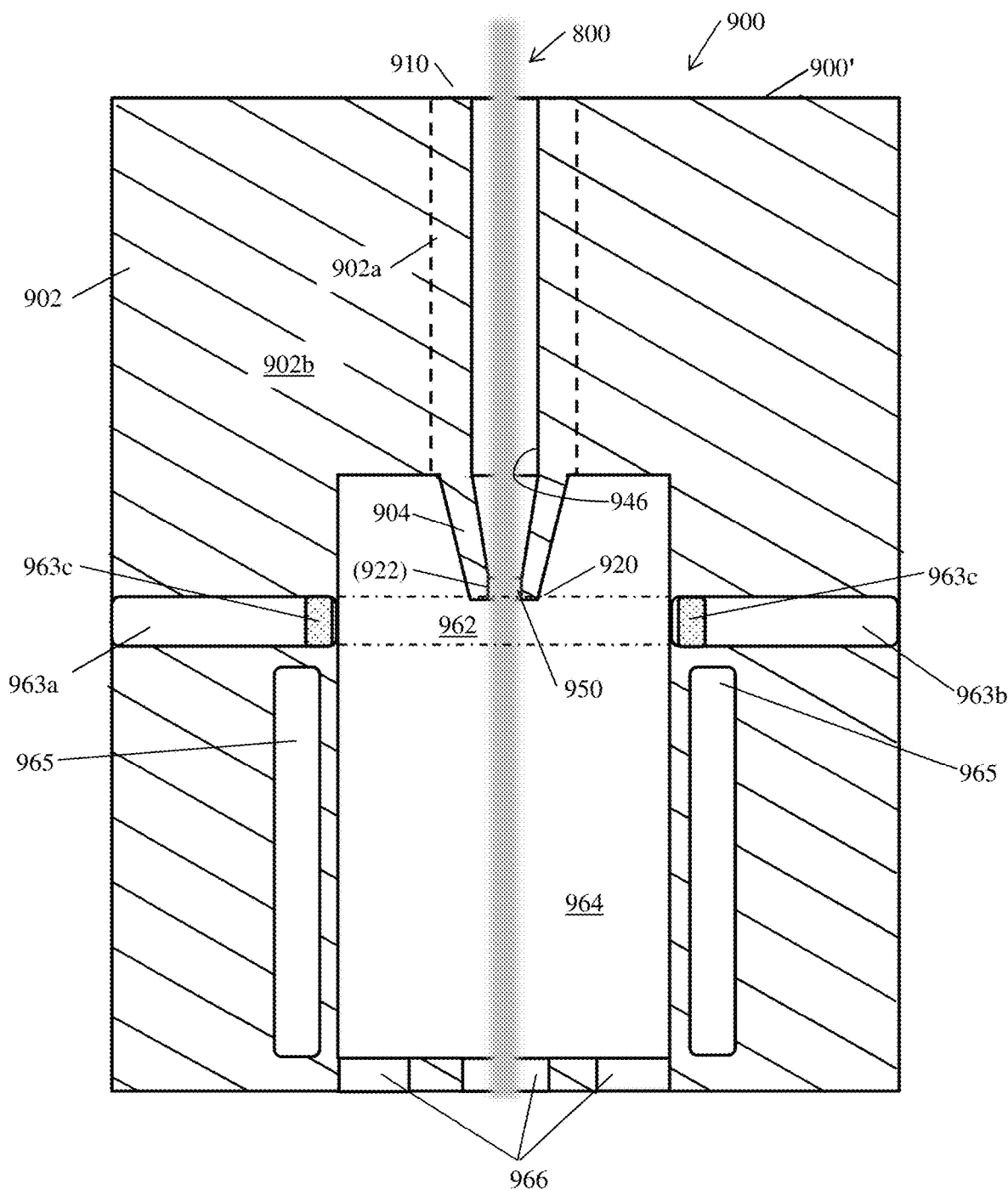
FIGS. 9A-9C illustrate further exemplary microfluidic flow-through elements provided as flow cells according to aspects of the present disclosure.
Figure 9B:
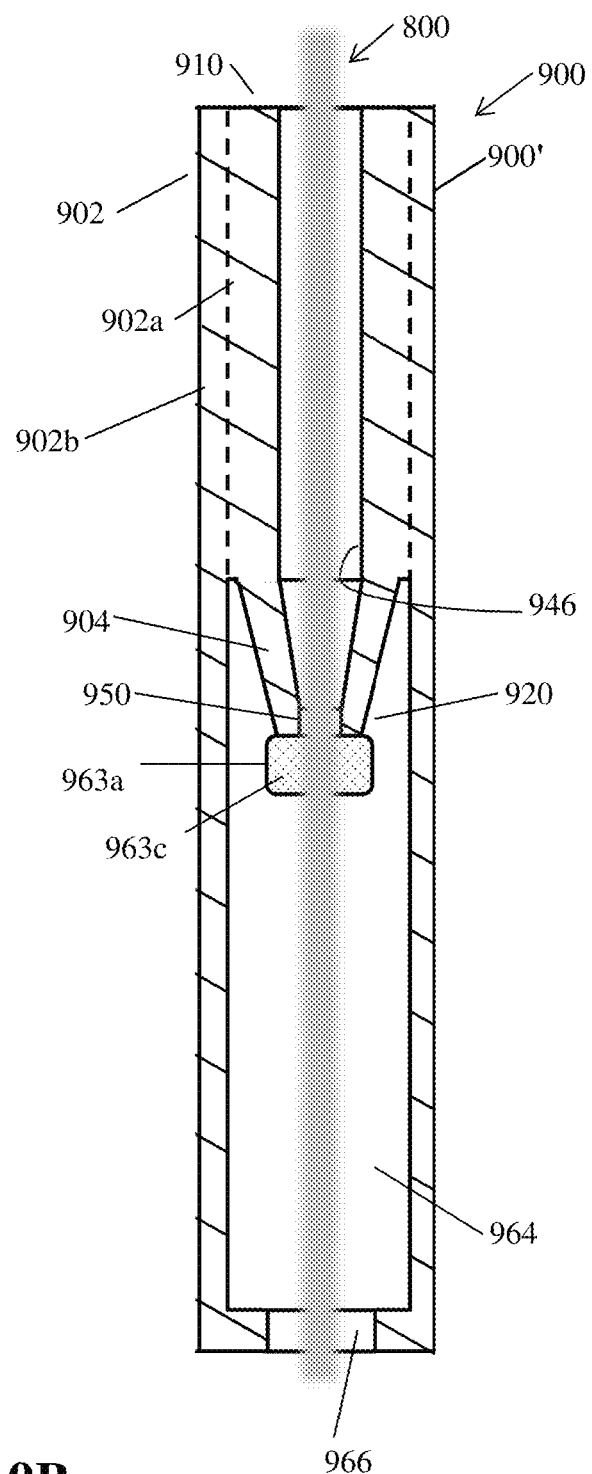

Referring now to FIGS. 9A and 9B, another embodiment of a microfluidic flow-through element 900 is schematically illustrated with an exemplary energy beam 800, as may be used to form the orifice 950, schematically shown. FIG. 9A shows a cross-sectional front view; FIG. 9B shows a cross-sectional side view. Microfluidic flow-through element 900 may be configured as a flow cell 900' for performing a process on a sample, wherein the flow cell 900' has all surfaces which may come into contact with the sample during a detection process and/or a sorting process being completely enclosed within the flow cell 900'. Thus, for example, the flow cell 900' for processing particles in a sample stream may include an enclosed plurality of integrally-constructed regions in fluid communication with one another. The integrally-constructed regions may include a flow path 946 having a hydrodynamic focusing region; a jet-forming orifice 950 located downstream of the flow path 946; a particle interrogation region 962 (see FIG. 9A); a droplet deflection region 964; and one or more droplet collection channels 966. The flow path 946 extends from an inlet 910, where the sample is received, to an outlet 920, where a jet of droplets is formed. The particle interrogation region 962 may be located upstream of, downstream of, and/or essentially at the exit of the jet-forming orifice 950. Flow cell 900' may have one or more interrogation beam channels 963a and one or more signal detection channels 963b aligned with the interrogation region 962. Channels 963a and 963b may be provided with optical windows and/or other optical elements 963c. On either side of the droplet deflection region 964, slots 965 (see FIG. 9A) for receiving one or more charge plates (not shown) may be provided. Other flow cell features are described in U.S. Ser. No. 14/030,946, titled "Flow Cell," filed Sep. 18, 2013, to Sharpe et al., which is incorporated by reference herein in its entirety.

Flow cell 900' may be formed from a unitarily-formed base substrate 902. Optionally, flow cell 900' may be formed by co-molding a unitarily-formed base element 902a (an example being shown with dashed lines) with the remainder of the flow cell 902b. Alternatively, the base substrate 902 of the flow cell 900' may be formed of multiple elements that are integrally assembled. In any event, whether unitarily-formed or integrally-assembled, the base substrate 902 (or the base element 902a) includes an end wall 922 at the downstream end of the flow path 946 as described above. The base substrate 902 (or the base element 902a) may be formed of any material as described above. The energy beam 800 is used to form the orifice 950 through the end wall 922 in the base substrate 902 (or the base element 902a) as described above.

In general, the microfluidic flow-through element and/or the base substrate may be provided with other functional elements or components. Thus, according to certain embodiments, one or more optical elements such as shown in FIGS. 9A and 9B may be provided in one or more side walls of the microfluidic flow-through element. These optical elements may allow for photo-excitation or photo-collection, for example, of a sample, flowing through the microfluidic flow-through element. Examples of optical elements may include transmissive, reflective, refractive, diffractive, diffusing, or other elements providing optical modalities. These features may be used to focus, capture, split, diverge, manipulate and/or transmit light (i.e., electromagnetic radiation) in some other useful manner associated with the measurement of the fluid or particle-containing fluid in the proximity of the base and/or orifice region. According to some embodiments, the optical elements 963c may be transmissive windows that are formed separately from the base substrate 902, 902b. Alternatively, the optical elements 963c may be unitarily-formed with the base substrate 902, 902b of the same material. In addition, one or more sensor elements, focusing elements, actuation or switching elements, charging elements, detection elements, etc. may also be included in the microfluidic flow-through elements.

Figure 9C:
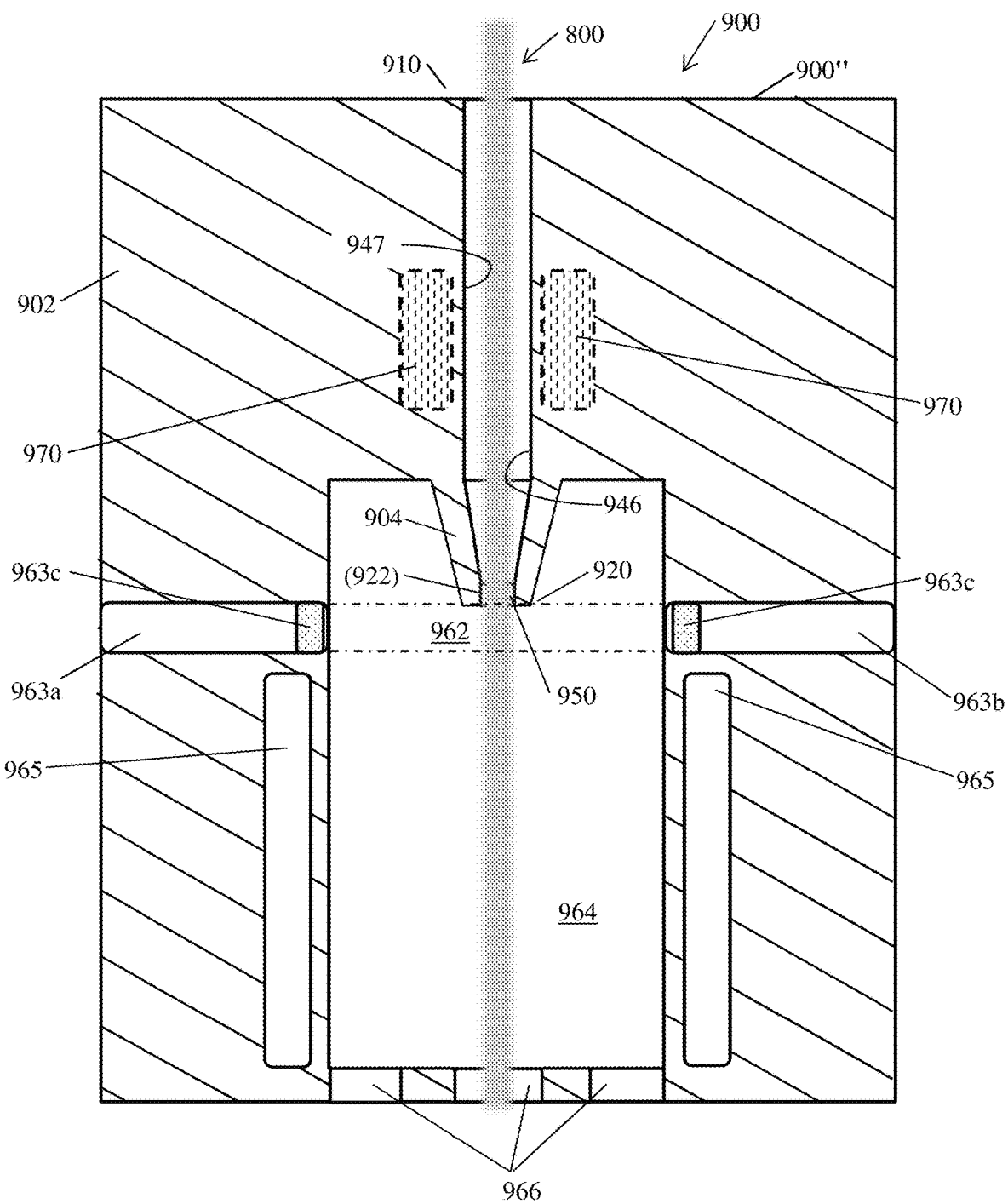

FIG. 9C schematically illustrates another embodiment of the microfluidic flow-through element 900 being provided as a flow cell 900''. The sample stream may be supplied without sheath fluid and the hydrodynamic focusing region may be replaced with an acoustic focusing region 947. As one example, one or more interdigitated transducers 970 may be used to create a surface acoustic wave (SAW) to focus the particles in the stream prior to the stream entering the jet-forming orifice 950. The interdigitated transducers 970 are shown in dashed lines in FIG. 9C as they may be provided on a substrate of a piezoelectric material that may be integrally joined to a surface of the flow cell 900". Alternatively, the interdigitated transducers 970 may be provided on a layer of piezoelectric material that may be operationally coupled to (and decouplable from) the flow cell 900'. SAW focusing using interdigitated transducers is described in U.S. Pat. No. 8,573,060 to Huang et al., titled "Particle Focusing Within a Microfluidic Device Using Surface Acoustic Waves," issued Nov. 5, 2013, which is incorporated by reference herein in its entirety.

In exemplary embodiments, microfluidic flow-through elements, for example, nozzle tips such as produced by the processes described above, may define orifice regions with predetermined characteristics, for example, lead-in and/or lead-out geometries, cross-sectional shapes, cross-sectional aspect ratios, tolerances, overall dimensions, and the like.

Although the teachings herein have been described with reference to exemplary embodiments and implementations thereof, the disclosed microfluidic flow-through elements and methods for forming and using the same are not limited to such exemplary embodiments/implementations. Rather, as will be readily apparent to persons skilled in the art from the descriptions taught herein, the disclosed microfluidic flow-through elements and methods for forming and using the same are susceptible to modifications, alterations and enhancements without departing from the spirit or scope of the invention. For example, in certain embodiments, the base substrate may be fabricated from glass, ceramic, metal, composite materials, etc. Further, the process for forming the base substrate may include compression molding, blow molding, casting, stamping, subtractive processes and additive processes, etc. Accordingly, all such modifications, alterations and enhancements within the scope hereof are encompassed herein.

What is claimed:

1. A process for forming a microfluidic nozzle tip, the process comprising:
    providing a polymeric base substrate having a flow path converging toward a closed end wall having an upstream surface and a downstream surface, the closed end wall having an end wall dimension defined between opposed flow path surfaces;
    aligning a laser relative to the polymeric base substrate;
    directing a beam from the laser in the flow-path direction, the beam from the laser having a corresponding cross-sectional beam dimension that is larger than the end wall dimension; and
    impinging the beam from the laser onto the upstream surface of the closed wall of the polymeric base substrate to form an orifice extending from the upstream surface to the downstream surface of the end wall of the polymeric base substrate, the orifice having a converging upstream orifice portion and a downstream orifice portion, the upstream orifice portion smoothly merges with the flow path at a transition region between the flow path and the upstream orifice portion.

2. The process of claim 1, wherein the downstream orifice portion is non-converging.

3. The process of claim 2, wherein the maximum cross-sectional area of the downstream orifice portion is less than or equal to the minimum cross-sectional area of the upstream orifice portion.

4. The process of claim 1, wherein the upstream orifice portion has a convergence angle that is substantially equal to a convergence angle of the flow path.

5. The process of claim 1, wherein the downstream orifice portion has a substantially constant cross-sectional area.

6. The process of claim 1, wherein the transition region between the flow path and the upstream orifice portion is formed without any discontinuities greater than 10 microns.

7. The process of claim 1, wherein the step of directing includes directing the beam from the laser in a downstream direction.

8. The process of claim 1, wherein the step of impinging the beam from the laser includes ablating the orifice and wherein the beam from the laser has a non-uniform transverse intensity profile and a transverse impinging footprint that is greater than a cross-section area of an exit orifice at a downstream end of the orifice.

9. The process of claim 1, wherein the step of impinging the beam from the laser includes using the laser to ablate the orifice, and wherein the downstream orifice portion of the orifice is formed as a substantially cylindrical channel having a length between approximately 70 microns to 150 microns and a diameter between approximately 60 microns to 100 microns.

10. The process of claim 1, wherein the step of impinging the beam from the laser includes removing material from the surface of the flow path upstream of the end wall.

11. The process of claim 1, wherein the step of impinging the beam from the laser forms the orifice without any discontinuities having a dimension greater than 10 microns.

12. The process of claim 1, further including:
    injecting a polymeric material into a mold to form the polymeric base substrate.

13. The process of claim 1, further including:
    forming the polymeric base substrate from a polymeric material having a low autofluorescence at a wavelength between approximately 450 nm to 550 nm.

14. The process of claim 1, further comprising:
    focusing the laser beam in a focal plane that is downstream or upstream of the closed end wall.

15. A process for forming a microfluidic nozzle tip, the process comprising:
    providing a polymeric base substrate having a conical flow path surface converging from an upstream end toward a closed end wall at a downstream end, the closed end wall having an upstream surface, a downstream surface, and an end wall dimension defined between opposing conical surfaces;
    aligning a laser beam relative to the polymeric base substrate;
    focusing the laser beam in a focal plane that is downstream or upstream of the closed end wall;
    impinging the laser beam onto the upstream surface or the downstream surface of the closed end wall, the laser beam having a corresponding impinging cross-sectional beam dimension that is larger than the end wall dimension; and
    forming an orifice extending from the upstream surface to the downstream surface of the end wall with the laser beam, the orifice having an upstream orifice portion that converges in a downstream direction and smoothly merges with the conical flow path surface at a transition region, the orifice having a downstream orifice portion that is non-converging.

16. The process of claim 15, wherein the step of forming the orifice includes ablating the orifice and wherein the beam from the laser has a non-uniform transverse intensity profile and a transverse impinging footprint that is greater than a cross-section area of an exit orifice at the downstream end of the orifice.

17. A process for forming a microfluidic nozzle tip, the process comprising:
 providing a polymeric base substrate having a flow path converging toward a closed end wall having an upstream surface and a downstream surface;
 aligning a laser relative to the polymeric base substrate;
 directing a beam from the laser in the flow-path direction; and
 impinging the beam from the laser onto the upstream surface of the closed wall of the polymeric base substrate to form an orifice extending from the upstream surface to the downstream surface of the end wall of the polymeric base substrate, the beam from the laser removing material from the upstream surface of the flow path relative to the end wall, the orifice having a converging upstream orifice portion and a downstream orifice portion, and the upstream orifice portion smoothly merges with the flow path at a transition region between the flow path and the upstream orifice portion.

18. The process of claim 17, wherein the downstream orifice portion is non-converging.

19. The process of claim 17, wherein the transition region between the flow path and the upstream orifice portion is formed without any discontinuities greater than 10 microns.

20. The process of claim 17, wherein the step of impinging the beam from the laser includes ablating the orifice and wherein the beam from the laser has a non-uniform transverse intensity profile and a transverse impinging footprint that is greater than a cross-section area of an exit orifice at a downstream end of the orifice.

21. The process of claim 17, wherein the step of impinging the beam from the laser includes using the laser to ablate the orifice, and wherein the downstream orifice portion of the orifice is formed as a substantially cylindrical channel having a length between approximately 70 microns to 150 microns and a diameter between approximately 60 microns to 100 microns.

22. The process of claim 17, wherein the step of impinging the beam from the laser forms the orifice without any discontinuities having a dimension greater than 10 microns.

* * * * *